United States Patent
Howard

(10) Patent No.: US 11,014,320 B2
(45) Date of Patent: May 25, 2021

(54) APPARATUSES AND METHODS FOR APPLYING PRESSURE TO EDGE SURFACES

(71) Applicant: The Boeing Company, Chicago, IL (US)

(72) Inventor: Jesse P. Howard, Arlington, WA (US)

(73) Assignee: The Boeing Company, Chicago, IL (US)

( * ) Notice: Subject to any disclaimer, the term of this patent is extended or adjusted under 35 U.S.C. 154(b) by 246 days.

(21) Appl. No.: 16/421,919

(22) Filed: May 24, 2019

(65) Prior Publication Data

US 2020/0368988 A1 Nov. 26, 2020

(51) Int. Cl.
*B30B 3/04* (2006.01)
*B30B 9/28* (2006.01)
(Continued)

(52) U.S. Cl.
CPC ............... *B30B 3/04* (2013.01); *B25B 5/02* (2013.01); *B25B 5/163* (2013.01); *B25B 5/166* (2013.01);
(Continued)

(58) Field of Classification Search
CPC . B23Q 1/76; B23Q 3/06; B23Q 1/527; B23Q 3/064; B23Q 7/003; B23Q 7/042; B25B 1/205; B25B 5/02; B25B 5/14; B25B 5/163; B25B 5/166; B25B 1/02; B25B 1/08; B25B 1/20; B25B 1/24; B25B 1/2457; B25B 1/2473; B25B 5/145; B25B 1/22; B25B 5/006; B25B 5/147; B30B 3/00; B30B 3/005; B30B 3/02; B30B 3/04; B30B 3/045; B30B 3/06; B30B 7/00; B30B 9/00; B30B 5/00; B30B 9/24; B30B 9/241;
(Continued)

(56) References Cited

U.S. PATENT DOCUMENTS 3,789,960 A * 2/1974 Warren .................... F16D 63/00
188/74
4,088,221 A * 5/1978 Bowser .............. B65G 47/8815
193/35 A
(Continued)

OTHER PUBLICATIONS

Howard, Jesse P., Apparatuses and Methods for Applying Pressure to Edge Surfaces, U.S. Appl. No. 16/421,896, filed May 24, 2019.
(Continued)

*Primary Examiner* — Joseph J Hail
*Assistant Examiner* — Timothy B Brady
(74) *Attorney, Agent, or Firm* — Kwan & Olynick LLP

(57) ABSTRACT

An apparatus for applying pressure to at least a portion of an edge surface, which bridges opposing faces of a workpiece, comprises a frame, a first roller, a second roller, a rotation-control member, a first biasing member, and a second biasing member. The first roller and the second roller are coupled to the frame, are rotatable relative to the frame, and are translationally fixed relative to the frame. The rotation-control member is movable relative to the frame, controlling rotation of the first roller and the second roller relative to the frame. The first biasing member is configured to operate in compression along a second axis. The second biasing member is positioned, in compression, between the frame and the rotation-control member.

20 Claims, 9 Drawing Sheets

(51) Int. Cl.
| | |
|---|---|
| *B30B 11/00* | (2006.01) |
| *B30B 9/24* | (2006.01) |
| *B25B 5/02* | (2006.01) |
| *B25B 5/16* | (2006.01) |
| *F16D 63/00* | (2006.01) |
| *F16D 49/00* | (2006.01) |
| *B65G 13/075* | (2006.01) |
| *B65G 7/04* | (2006.01) |

(52) U.S. Cl.
CPC .............. *B30B 9/241* (2013.01); *B30B 9/245* (2013.01); *B30B 9/28* (2013.01); *B30B 11/006* (2013.01); *B65G 7/04* (2013.01); *B65G 13/075* (2013.01); *B65G 2205/00* (2013.01); *F16D 49/00* (2013.01); *F16D 63/00* (2013.01)

(58) Field of Classification Search
CPC ......... B30B 9/242; B30B 9/245; B30B 9/246; B30B 9/247; B30B 9/28; B30B 11/00; B30B 11/006; B30B 5/02; B65G 7/12; B65G 49/061; B65G 13/075; B65G 2205/04; B65G 67/08; B65G 47/8815; B65G 13/02; B65G 2205/00; B65G 2205/06; B65G 7/04; B66C 1/48; F16D 49/00; F16D 63/00; B65D 2585/687; B65D 85/68
USPC ...................................................... 188/72.7
See application file for complete search history.

(56) References Cited

U.S. PATENT DOCUMENTS

| | | | | |
|---|---|---|---|---|
| 4,465,422 | A * | 8/1984 | Blust, Sr. ................. | B23Q 1/76 408/45 |
| 4,658,940 | A * | 4/1987 | Ulmann .................. | F16D 41/08 188/161 |
| 4,759,429 | A * | 7/1988 | Margetts ................. | F16D 65/22 188/343 |
| 4,770,070 | A * | 9/1988 | Sowers ..................... | B25B 7/00 81/418 |
| 5,249,487 | A * | 10/1993 | Armfield, IV .......... | B25B 23/00 81/186 |
| 5,257,923 | A * | 11/1993 | Kagawa ..................... | B30B 3/04 425/290 |
| 5,478,190 | A * | 12/1995 | Helton ...................... | B60P 1/52 193/35 A |
| 6,382,610 | B1 * | 5/2002 | Corbin ................... | B25B 1/205 269/130 |
| 6,458,022 | B1 * | 10/2002 | Folz ........................ | B23Q 1/76 269/196 |
| 7,263,917 | B1 * | 9/2007 | Benysh ................. | B25B 13/481 81/186 |
| 8,662,260 | B2 * | 3/2014 | Baldeosingh ........... | F16D 65/12 188/72.7 |
| 10,363,635 | B2 * | 7/2019 | Claretti ................. | B65G 1/1378 |
| 10,654,601 | B2 * | 5/2020 | Giublin ................... | B65B 5/067 |
| 2002/0113448 | A1 * | 8/2002 | Kazerooni ............... | B25J 15/00 294/86.4 |
| 2002/0125727 | A1 * | 9/2002 | Kazerooni .............. | B66C 1/445 294/86.4 |
| 2003/0032376 | A1 * | 2/2003 | Ikeda .................... | B24B 41/007 451/242 |
| 2004/0103826 | A1 * | 6/2004 | Ponzio ..................... | B23Q 3/18 108/55.3 |
| 2005/0034565 | A1 * | 2/2005 | Drzewiecki ........... | E21B 19/164 81/57.17 |
| 2006/0107798 | A1 * | 5/2006 | Falzone .................. | B25B 17/00 81/57.3 |
| 2006/0288752 | A1 * | 12/2006 | Burzlaff ............... | B21D 39/021 72/220 |
| 2007/0209194 | A1 * | 9/2007 | Bradfield .............. | H01F 41/064 29/605 |
| 2008/0041245 | A1 * | 2/2008 | Judocus ................. | B01D 33/70 100/118 |
| 2013/0087054 | A1 * | 4/2013 | Frangenberg ............. | B30B 3/04 100/35 |
| 2013/0129887 | A1 * | 5/2013 | Hoppe .................... | B30B 15/34 426/479 |
| 2013/0223956 | A1 * | 8/2013 | Gostylla ................. | B21J 15/32 411/501 |
| 2014/0041972 | A1 * | 2/2014 | Kim ........................ | F16D 49/00 188/74 |
| 2014/0094099 | A1 * | 4/2014 | Hildebrandt ............ | B24B 21/20 451/303 |
| 2014/0150236 | A1 * | 6/2014 | Kempf .................... | A63J 1/028 29/428 |
| 2014/0255129 | A1 * | 9/2014 | Kenner ................. | B23B 13/123 414/14 |
| 2014/0345431 | A1 * | 11/2014 | Pierce ................. | B23D 57/0084 83/72 |
| 2018/0056486 | A1 * | 3/2018 | Liao ........................ | B25B 5/04 |
| 2018/0326590 | A1 * | 11/2018 | Masuda .............. | B24B 27/0038 |
| 2019/0076569 | A1 * | 3/2019 | Peterson ................. | A61L 9/20 |
| 2019/0389098 | A1 * | 12/2019 | Stone ................. | B29D 99/0014 |

OTHER PUBLICATIONS

Howard, Jesse P., Apparatuses and Methods for Applying Pressure to Edge Surfaces, U.S. Appl. No. 16/421,900, filed May 24, 2019.
Howard, Jesse P., Apparatuses and Methods for Applying Pressure to Edge Surfaces, U.S. Appl. No. 16/421,904, filed May 24, 2019.
Howard, Jesse P., Apparatuses and Methods for Applying Pressure to Edge Surfaces, U.S. Appl. No. 16/421,912, filed May 24, 2019.
Howard, Jesse P., Apparatuses and Methods for Applying Pressure to Edge Surfaces, U.S. Appl. No. 16/421,935, filed May 24, 2019.

* cited by examiner

APPARATUSES AND METHODS FOR APPLYING PRESSURE TO EDGE SURFACES

BACKGROUND

Applying pressure to edge surfaces of workpieces often requires a specialized clamping apparatus, which supports the workpiece to apply pressure to the edge surface of interest. However, some workpieces are too large to be supported by a clamping apparatus. Furthermore, conventional hand-held clamps are generally not suitable for applying edge pressure to large workpieces by virtue of their design.

SUMMARY

Accordingly, apparatuses and methods, intended to address at least the above-identified concerns, would find utility.

The following is a non-exhaustive list of examples, which may or may not be claimed, of the subject matter, disclosed herein.

Disclosed herein is an apparatus for applying pressure to at least a portion of an edge surface, which bridges opposing faces of a workpiece. The apparatus comprises a frame, a first roller, a second roller, a rotation-control member, a first biasing member, and a second biasing member. The first roller is coupled to the frame, is rotatable relative to the frame about a first pivot axis, and is translationally fixed relative to the frame. The second roller is coupled to the frame, is rotatable relative to the frame about a second pivot axis, and is translationally fixed relative to the frame. The second pivot axis is spaced a distance D1 from the first pivot axis along a first axis, which intersects and is perpendicular to the first pivot axis and to the second pivot axis. The rotation-control member is coupled to the frame and is movable relative to the frame. The first biasing member is configured to operate in compression along a second axis that is perpendicular to the first axis, to the first pivot axis, and to the second pivot axis. The second biasing member is positioned, in compression, between the frame and the rotation-control member. When the rotation-control member is at a first location relative to the frame, the first roller and the second roller are rotatable relative to the frame. When the rotation-control member is at a second location relative to the frame, the first roller and the second roller are rotationally fixed relative to the frame.

Apparatus is configured to apply the pressure to at least the portion of edge surface while apparatus is supported by workpiece. Apparatus can be installed on workpiece by an operator with minimal efforts, e.g., using only one hand. Furthermore, apparatus is configured to retain on workpiece, supported by opposing faces of workpiece. Apparatus applies the pressure uniformly using first biasing member, which is configured to operate in compression and conformally contact at least the portion of edge surface. The level of pressure is determined by compression of first biasing member and, in some examples, is controllable by the degree of protrusion of workpiece into apparatus.

Also disclosed herein is a method of applying pressure to at least a portion of an edge surface, which bridges opposing faces of a workpiece. The method uses an apparatus that comprises a frame, a first roller, a second roller, a rotation-control member, a first biasing member, and a second biasing member. The first roller is coupled to the frame and is rotatable relative to the frame about a first pivot axis and is translationally fixed relative to the frame. The second roller is coupled to the frame and is rotatable relative to the frame about a second pivot axis and is translationally fixed relative to the frame. The second pivot axis is spaced from the first pivot axis along a first axis, which intersects and is perpendicular to the first pivot axis and to the second pivot axis. The rotation-control member is coupled to the frame and is movable relative to the frame. The first biasing member is coupled to the frame. The second biasing member is positioned, in compression, between the frame and the rotation-control member. The method comprises aligning the apparatus with the workpiece, such that the edge surface of the workpiece is centered along a second axis that is perpendicular to the first axis and that extends between the first pivot axis of the first roller and the second pivot axis of the second roller. The method further comprises positioning the rotation-control member at a first location relative to the frame, such that the first roller and the second roller are rotatable relative to the frame. The method also comprises, with the rotation-control member positioned at the first location relative to the frame, moving the apparatus and the workpiece relative to each other, such that the workpiece is received between the first roller and the second roller, so that the first biasing member operates in compression along the second axis, perpendicular to the first axis, to the first pivot axis, and to the second pivot axis, thus applying the pressure to at least the portion of the edge surface of the workpiece, while the first roller and the second roller apply equal and opposite forces to opposing faces of the workpiece. The method additionally comprises positioning the rotation-control member at a second location relative to the frame, such that the first roller and the second roller are fixed relative to the frame, creating a frictional coupling between the apparatus and the workpiece, which maintains the pressure, applied to at least the portion of the edge surface by the first biasing member.

Aligning apparatus with workpiece, such that edge surface of workpiece is centered along second axis, ensures that workpiece can be later inserted between first roller and second roller. Furthermore, positioning rotation-control member at the first location relative to frame ensures that first roller and second roller are able rotatable relative to frame as, for example, is shown in FIG. 2B. The rotation of first roller and second roller allows for workpiece to be inserted between first roller and second roller. Moving apparatus and workpiece relative to each other results in workpiece being received between first roller and second roller. Upon containing first biasing member with edge surface of workpiece, first biasing member compresses. This contact and compression results in first biasing member applying the pressure to at least the portion of edge surface of workpiece. The level of pressure depends on the compression level, which in turn depends on how far workpiece is received between first roller and second roller.

BRIEF DESCRIPTION OF THE DRAWINGS

Figure 1:
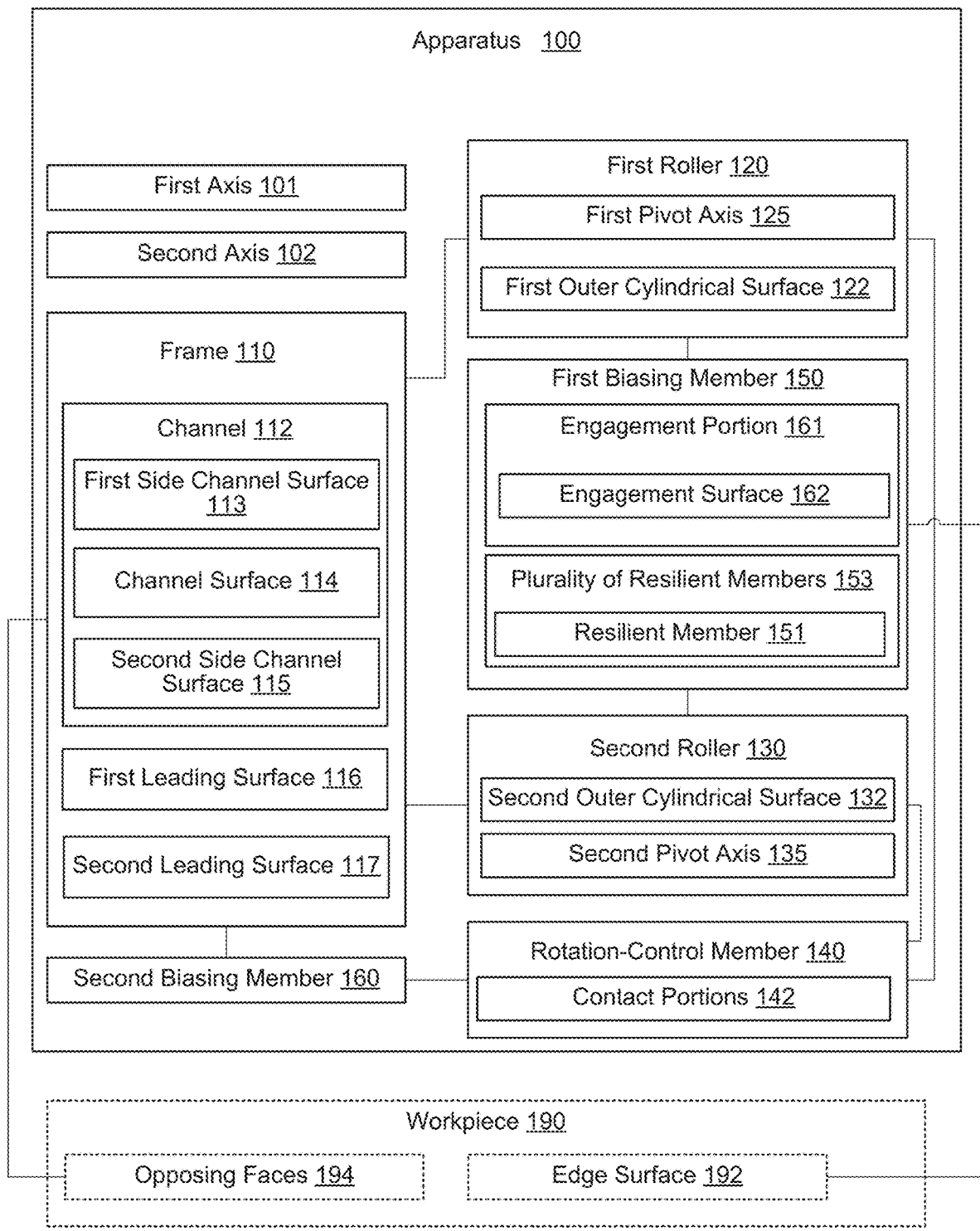
Figure 2A:
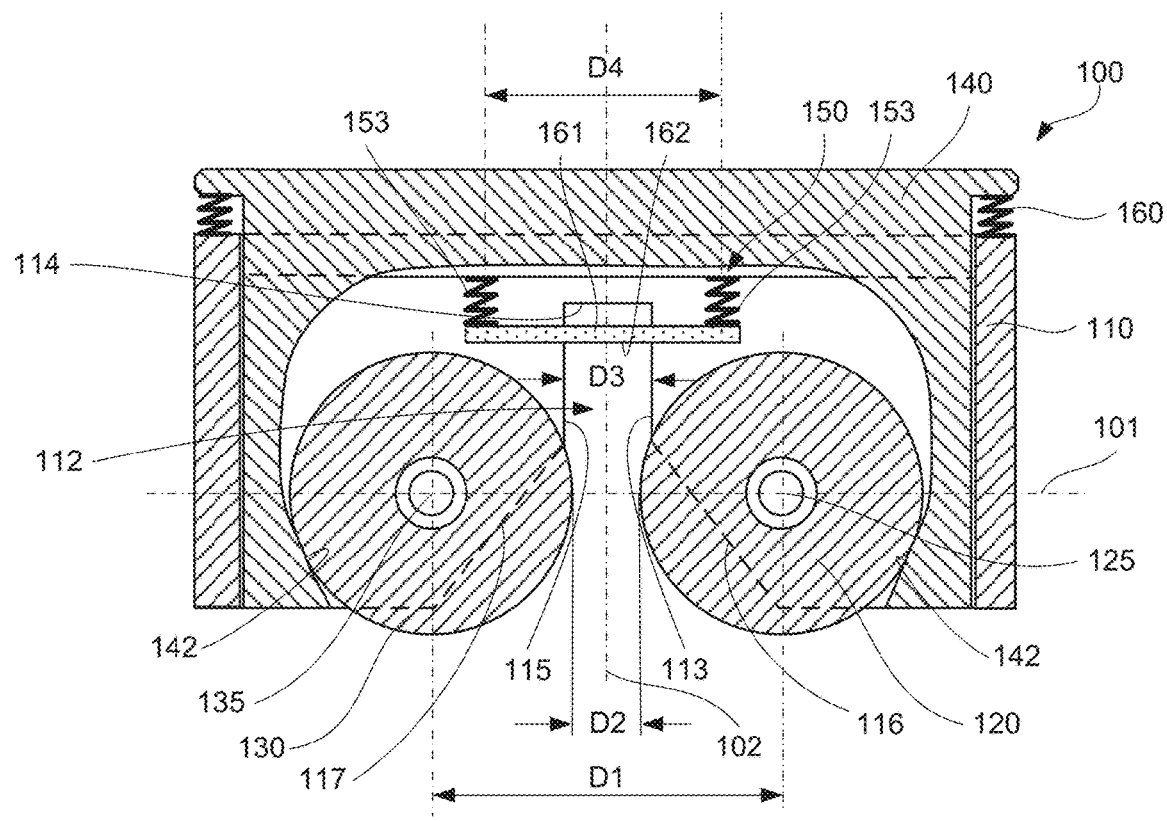
Figure 2B:
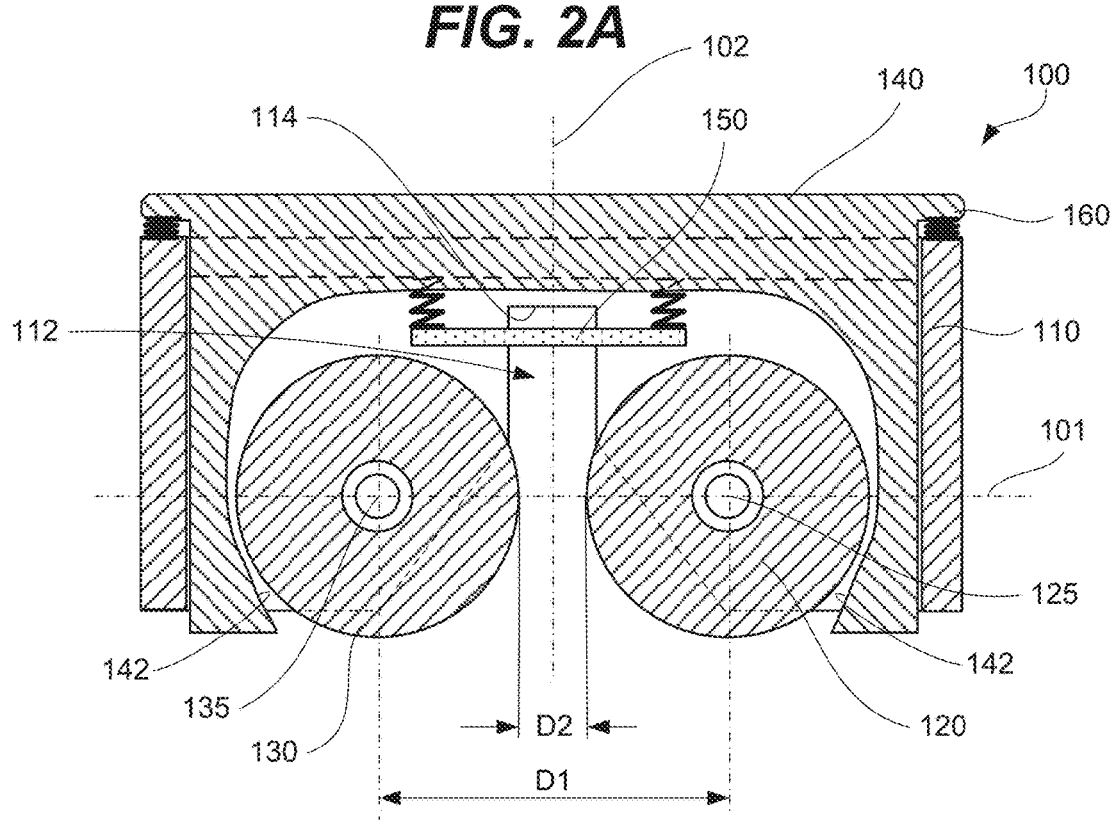
Figure 2C:
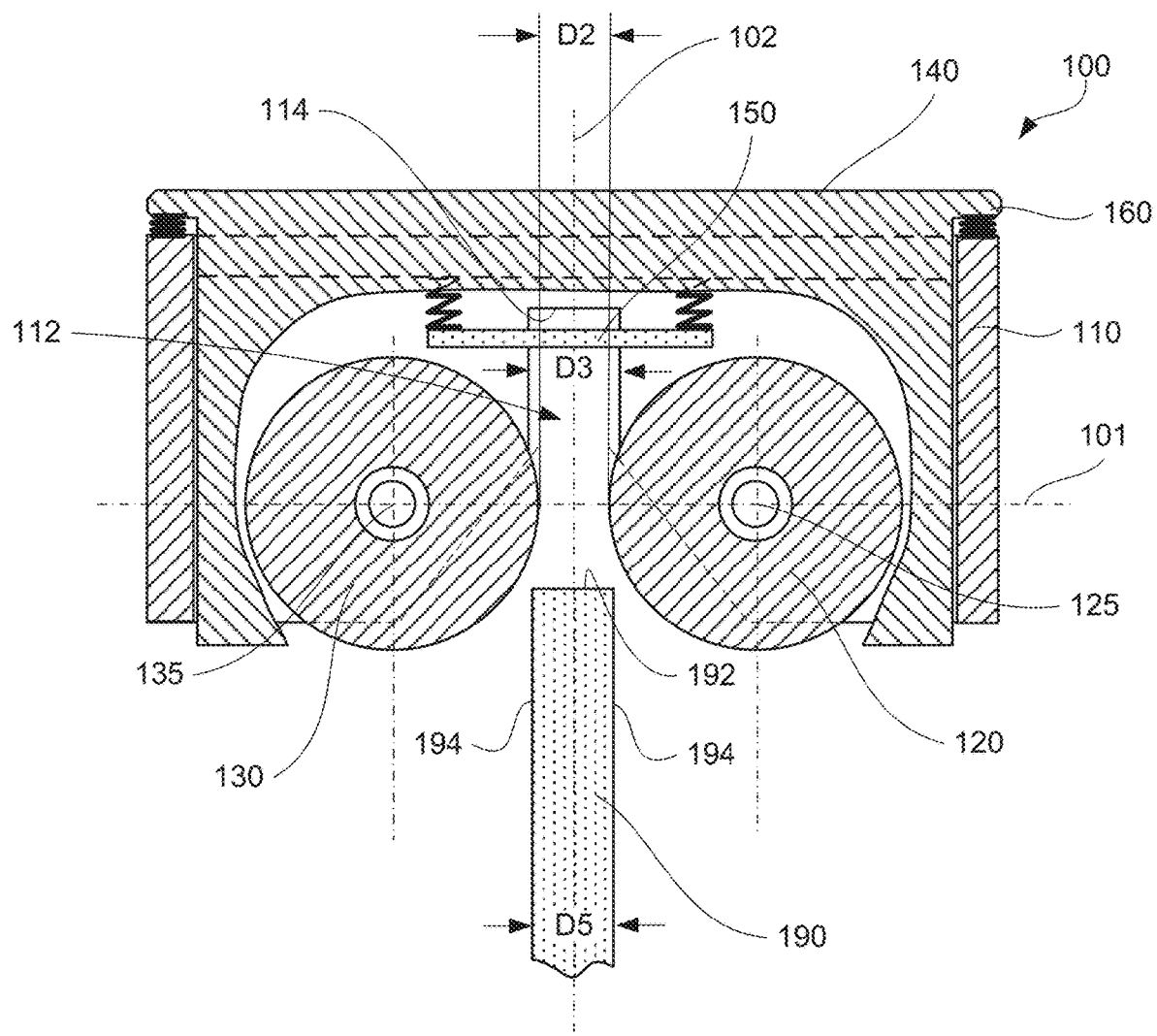
Figure 2D:
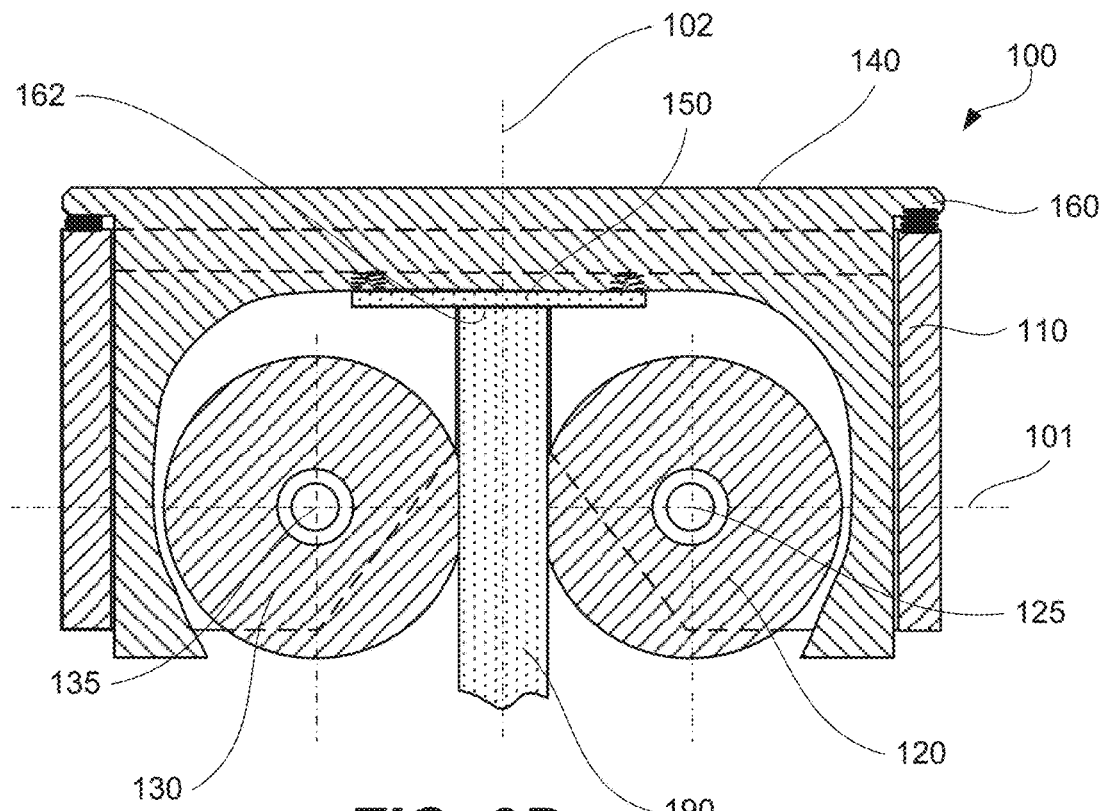
Figure 2E:
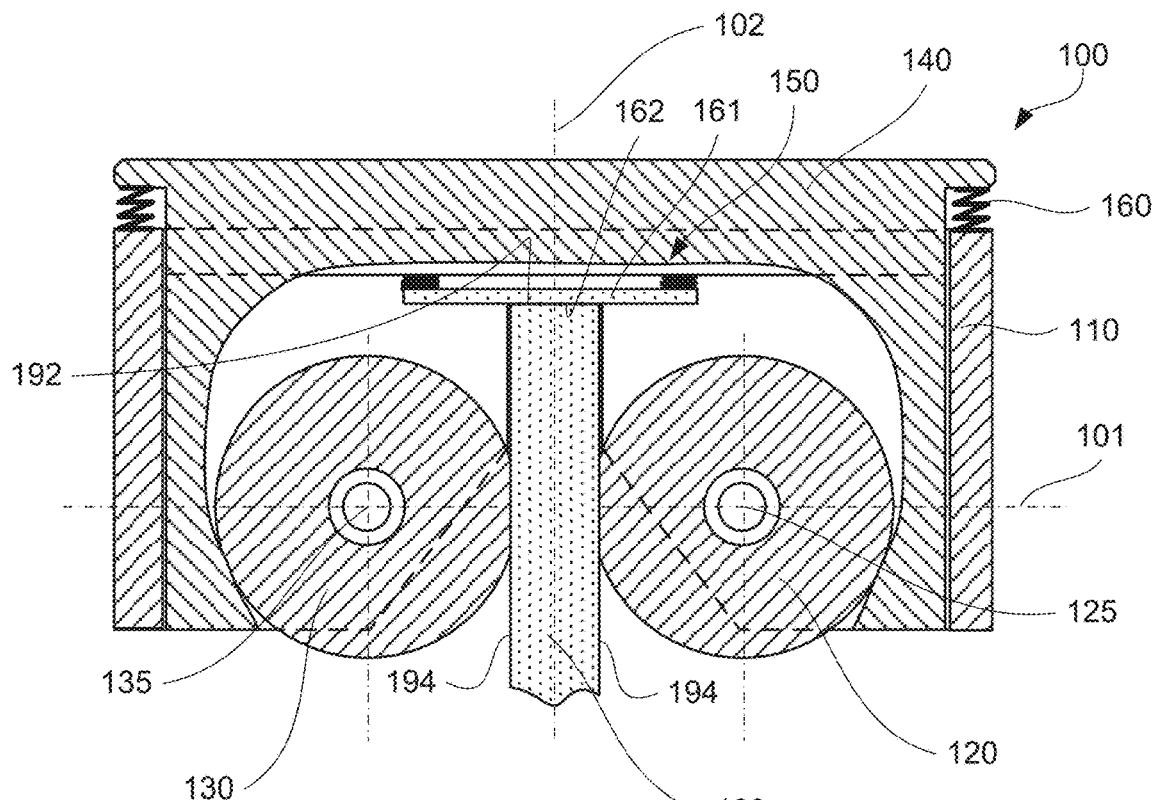
Figure 2F:
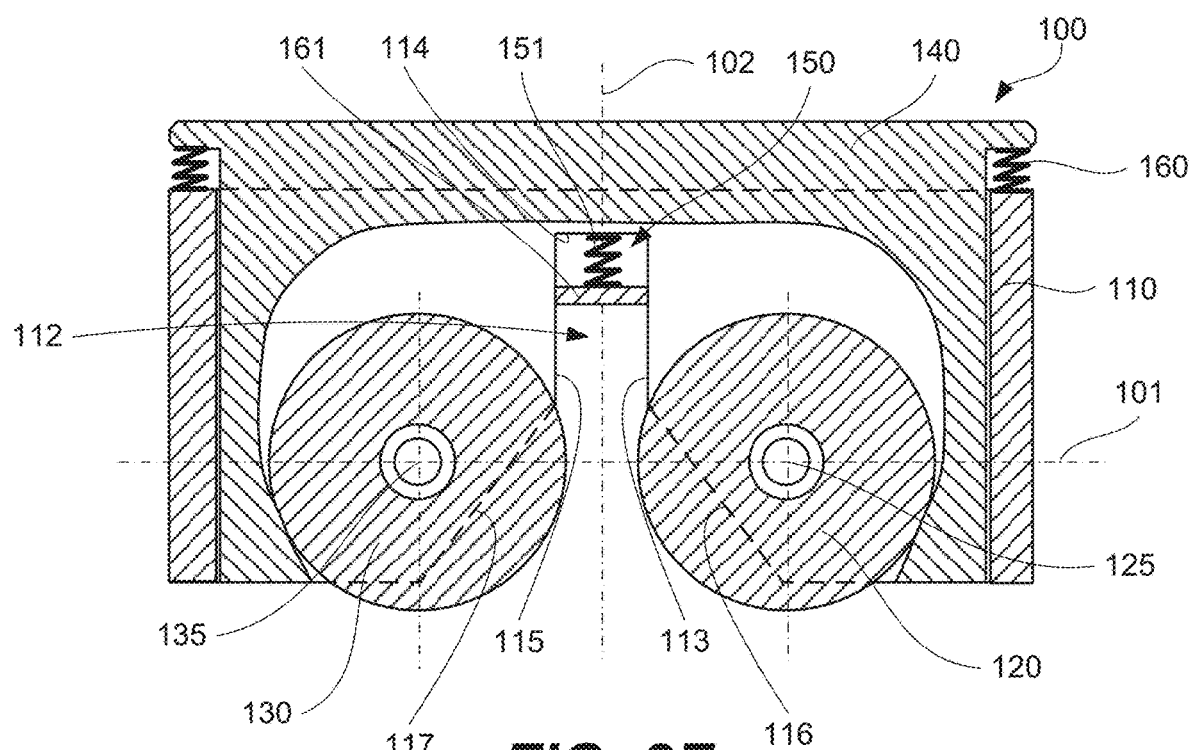
Figure 2G:
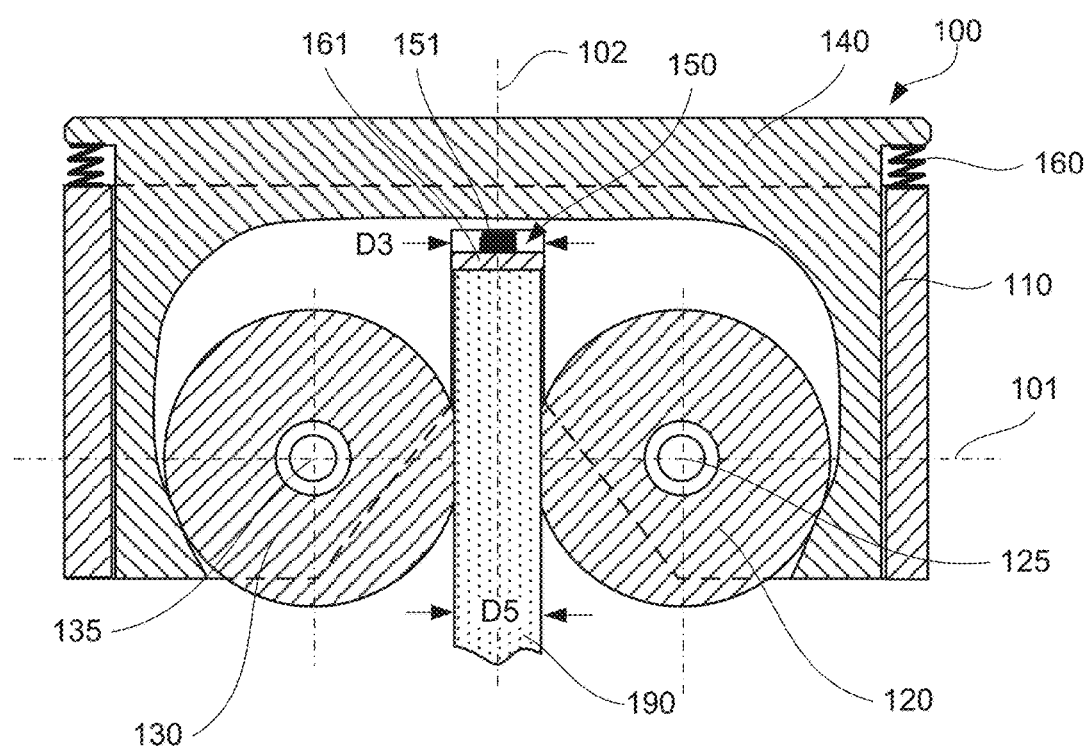
Figure 3A:
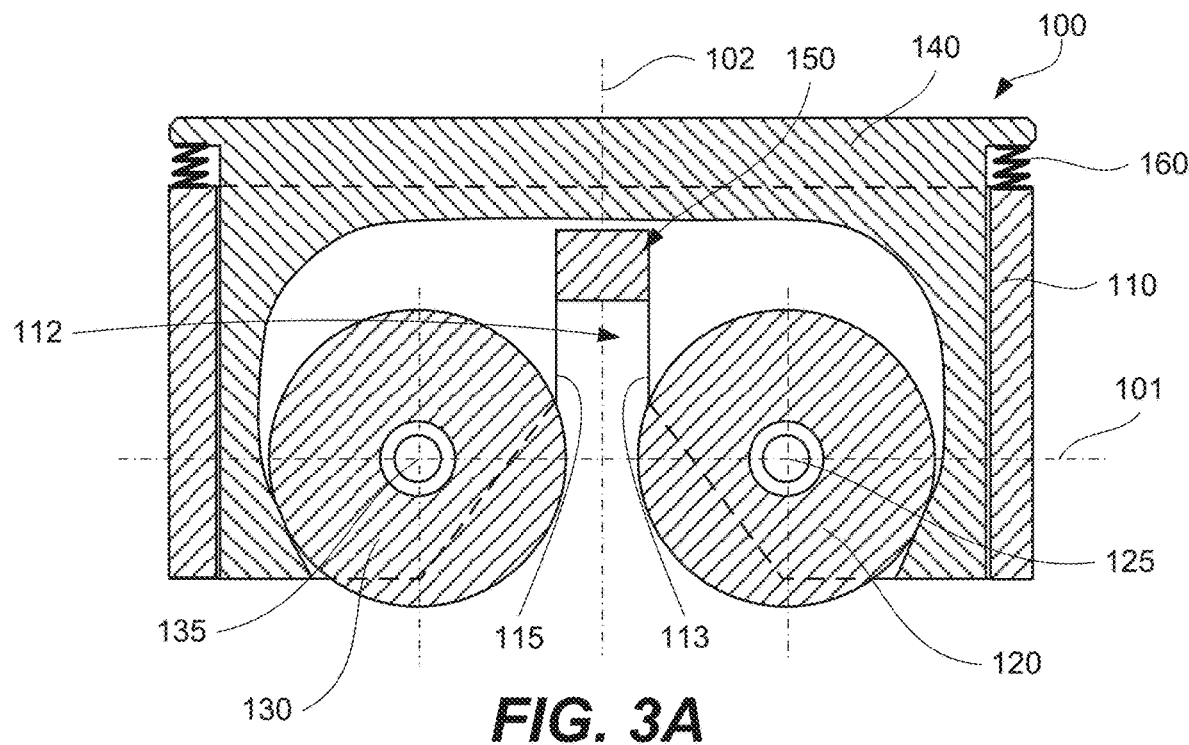
Figure 3B:
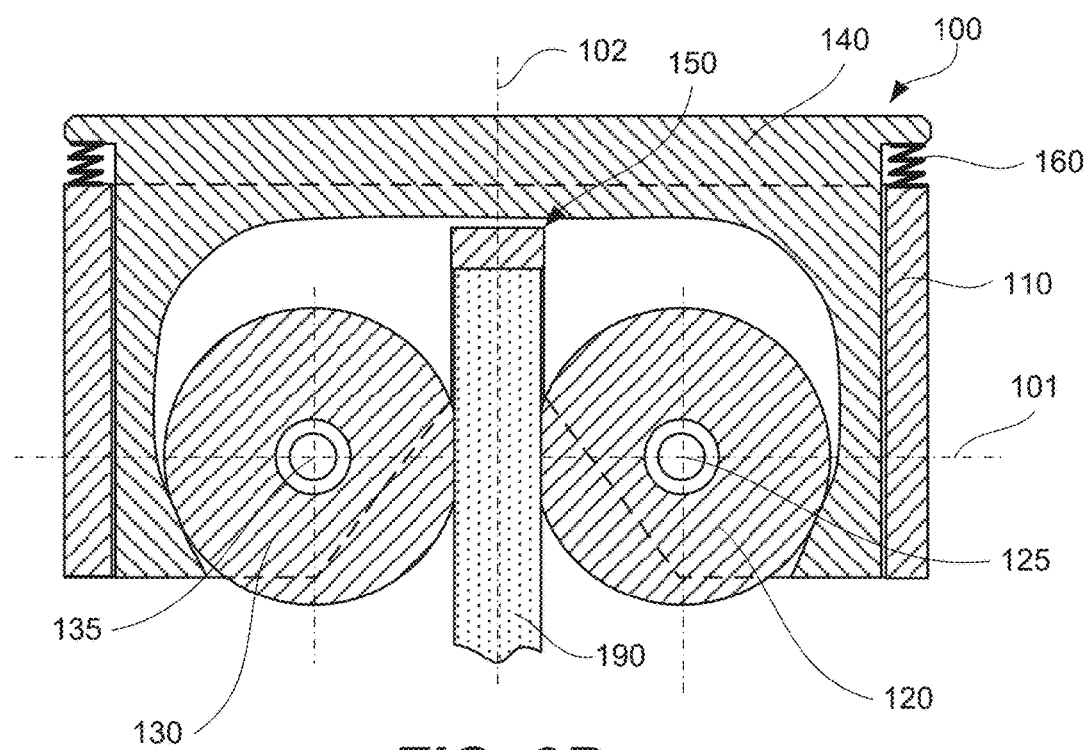
Figure 4:
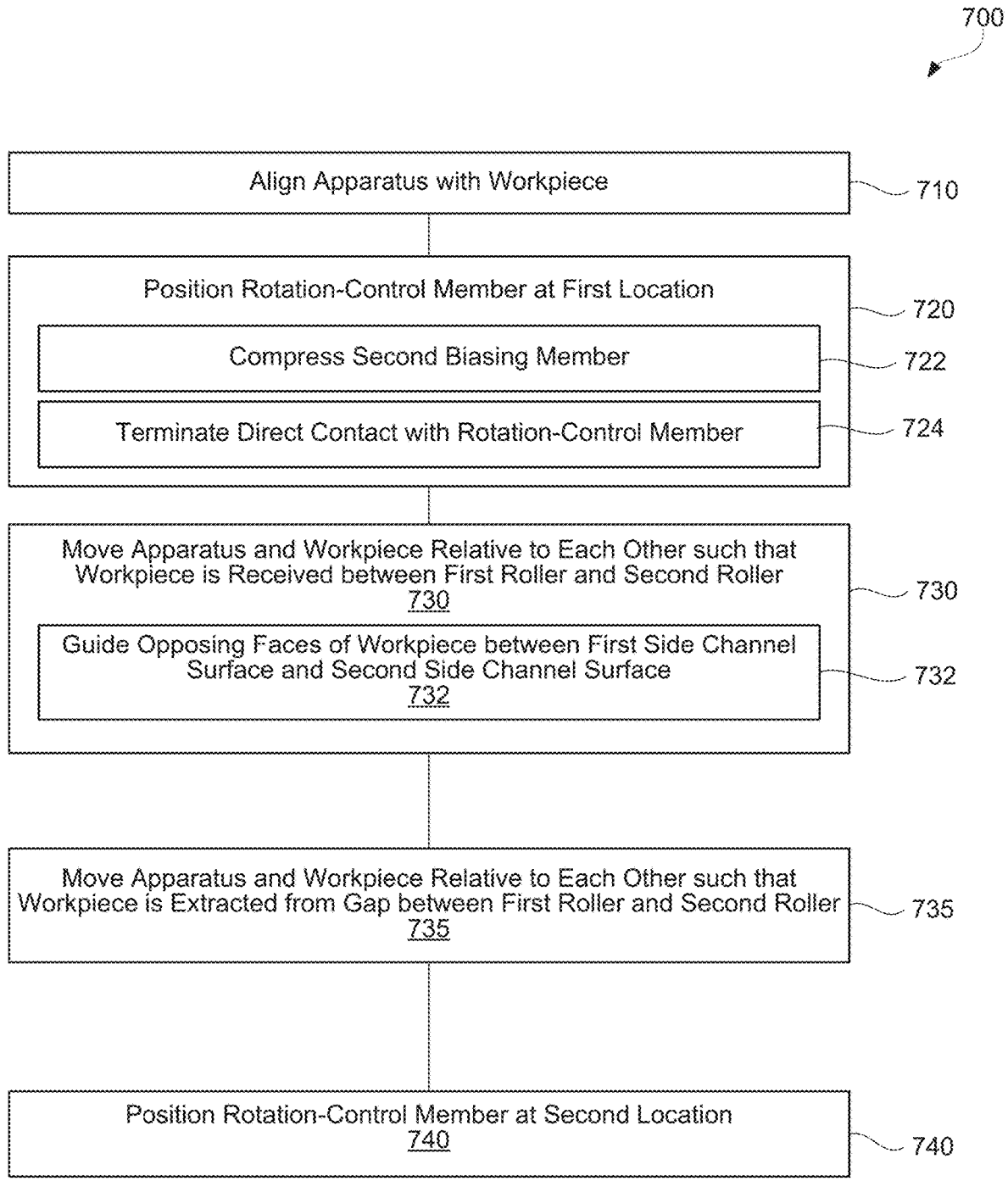
Figure 5:
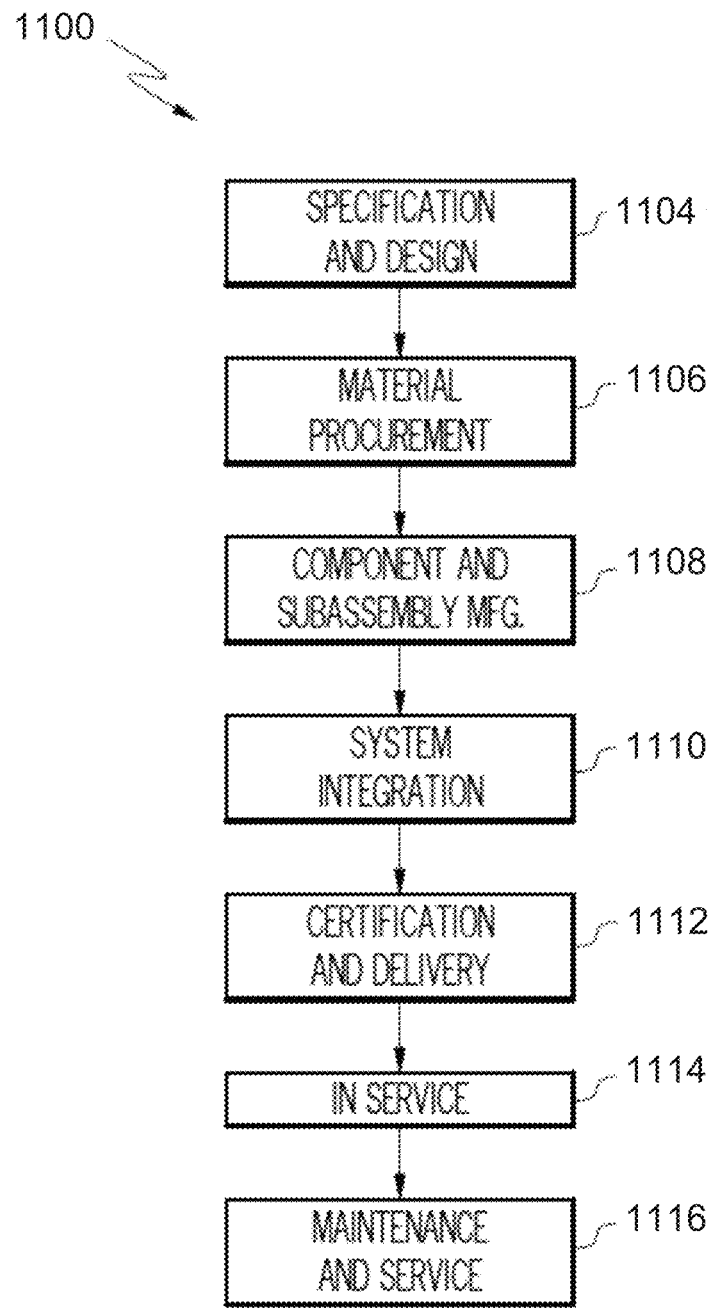

Having thus described one or more examples of the present disclosure in general terms, reference will now be made to the accompanying drawings, which are not necessarily drawn to scale, and wherein like reference characters designate the same or similar parts throughout the several views, and wherein:

FIG. 1 is a block diagram of an apparatus for applying pressure to at least a portion of an edge surface of a workpiece, according to one or more examples of the present disclosure;

FIG. 2A is a cross-sectional side view of the apparatus of FIG. 1 with the rotation-control member of the apparatus at a second location relative to the frame, according to one or more examples of the present disclosure;

FIG. 2B is a cross-sectional side view of the apparatus of FIG. 1 with the rotation-control member of the apparatus at a first location relative to the frame, according to one or more examples of the present disclosure;

FIG. 2C is a cross-sectional side view of the apparatus of FIG. 1, showing a workpiece aligned relative to the apparatus and prior to receiving the workpiece between the first roller and the second roller of the apparatus, according to one or more examples of the present disclosure;

FIG. 2D is a cross-sectional side view of the apparatus of FIG. 1 after the workpiece is received between the first roller and the second roller of the apparatus, according to one or more examples of the present disclosure;

FIG. 2E is a cross-sectional side view of the apparatus of FIG. 1 after the workpiece is received between the first roller and the second roller of the apparatus and after the rotation-control member of the apparatus is positioned at the second location relative to the frame, according to one or more examples of the present disclosure;

FIG. 2F is a cross-sectional side view of another example of the apparatus of FIG. 1 with an engagement portion positioned within a channel of the frame, according to one or more examples of the present disclosure;

FIG. 2G is a cross-sectional side view of the apparatus of FIGS. 1 and 2F after the workpiece is received between the first roller and the second roller of the apparatus, according to one or more examples of the present disclosure;

FIG. 3A is a cross-sectional side view of another example of the apparatus of FIG. 1 with a first biasing member being compressible, according to one or more examples of the present disclosure;

FIG. 3B is a cross-sectional side view the apparatus of FIGS. 1 and 3B after the workpiece is received between the first roller and the second roller of the apparatus, according to one or more examples of the present disclosure;

FIG. 4, is a block diagram of a method of applying pressure to at least a portion of an edge surface of a workpiece, using the apparatus of FIG. 1, according to one or more examples of the present disclosure;

FIG. 5 is a block diagram of aircraft production and service methodology; and

Figure 6:
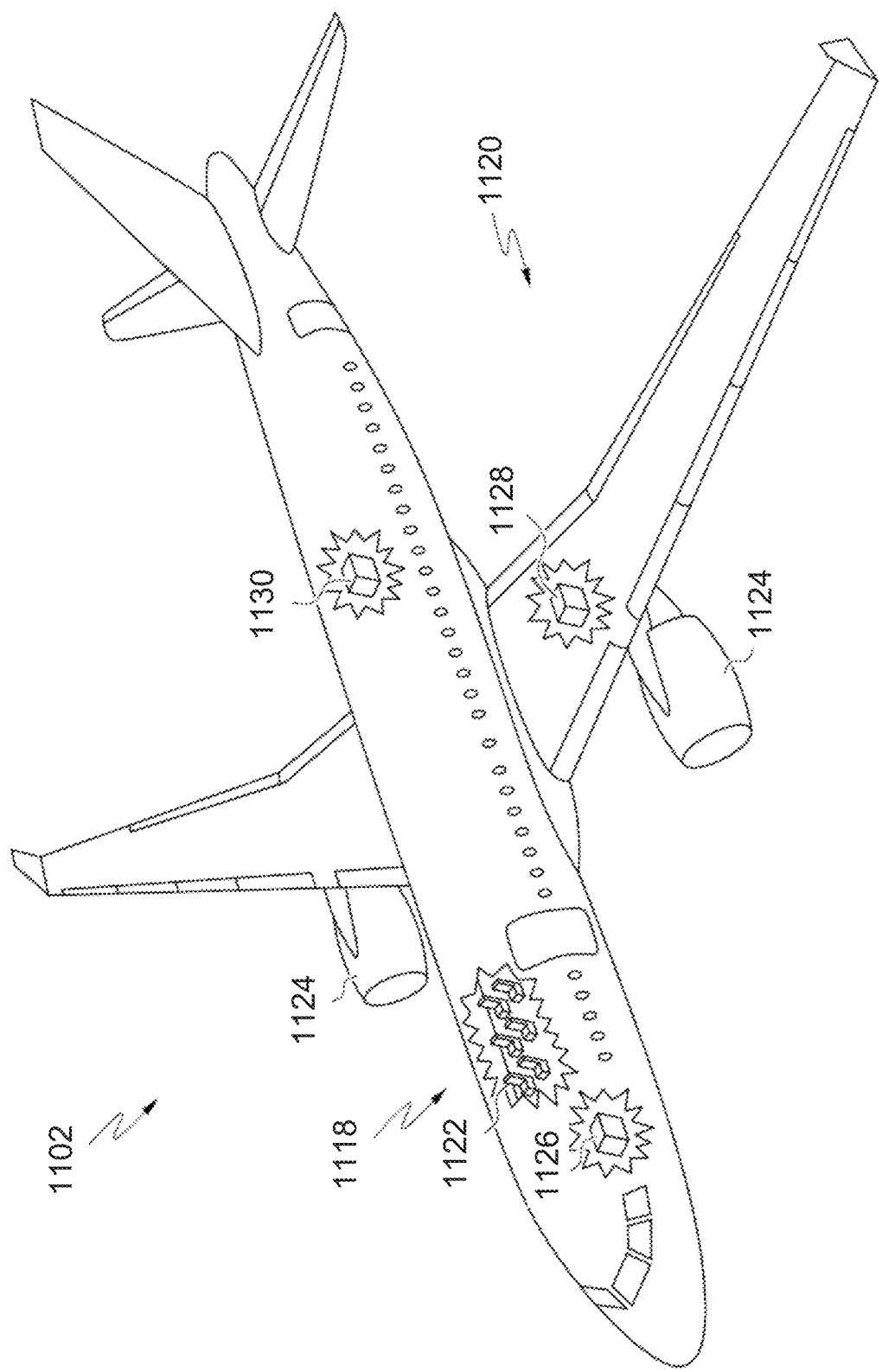

FIG. 6 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 5 and 6, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 5 and 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2A-2G and 3A-3B, apparatus 100 for applying pressure to at least a portion of edge surface 192, which bridges opposing faces 194 of workpiece 190, is disclosed. Apparatus 100 comprises frame 110, first roller 120, second roller 130, first biasing member 150, and second biasing member 160. First roller 120 is coupled to frame 110 and is rotatable relative to frame 110 about first pivot axis 125. First roller 120 is translationally fixed relative to frame 110. Second roller 130 is coupled to frame 110 and is rotatable relative to frame 110 about second pivot axis 135. Second roller 130 is translationally fixed relative to frame 110. Second pivot axis 135 is spaced distance D1 from first pivot axis 125 along first axis 101, which intersects and is perpendicular to first pivot axis 125 and to second pivot axis 135. Rotation-control member 140 is movable relative to frame 110. First biasing member 150 is configured to operate in compression along second axis 102 that is perpendicular to first axis 101, to first pivot axis 125, and to second pivot axis 135. Second biasing member 160 is positioned, in compression, between frame 110 and rotation-control member 140. When rotation-control member 140 is at a first location relative to frame 110, first roller 120 and second roller 130 are rotatable relative to frame 110. When rotation-control member 140 is at a second location relative to frame 110, first roller 120 and second roller 130 are rotationally fixed relative to frame 110. The preceding subject matter of this paragraph characterizes example 1 of the present disclosure.

Apparatus 100 is configured to apply the pressure to at least the portion of edge surface 192 while apparatus 100 is supported by workpiece 190. Apparatus 100 can be installed on workpiece 190 by an operator with minimal efforts, e.g., using only one hand. Furthermore, apparatus 100 is configured to retain on workpiece 190, supported by opposing faces 194 of workpiece 190.

Apparatus 100 applies the pressure uniformly using first biasing member 150, which is configured to operate in compression and conformally contact at least the portion of edge surface 192. The level of pressure is determined by compression of first biasing member 150 and, in some examples, is controllable by the degree of protrusion of workpiece 190 into apparatus 100.

Specifically, when workpiece 190 is received between first roller 120 and second roller 130 of apparatus 100, first biasing member 150 comes in contact with at least the portion of edge surface 192. Furthermore, first biasing member 150 compresses thereby applying the pressure to at least the portion of edge surface 192.

The location of rotation-control member 140 controls rotation of first roller 120 and second roller 130 thereby determining when workpiece 190 can be received between first roller 120 and second roller 130 and/or retracted from apparatus 100. When workpiece 190 is received between first roller 120 and second roller 130, workpiece 190 forms frictional coupling with first roller 120 and second roller 130. This frictional coupling ensures that workpiece 190 can be inserted between first roller 120 and second roller 130 and/or retracted from apparatus 100 only when first roller 120 and second roller 130 rotate. In other words, once workpiece 190 is positioned between first roller 120 and second roller 130 and frictionally coupled to first roller 120 and second roller 130, the linear movement of workpiece 190 along second axis 102 corresponds to the rotation of first roller 120 and second roller 130. Workpiece 190 cannot slide through the gap between first roller 120 and second roller 130 when first roller 120 and second roller 130 do not rotate.

When rotation-control member 140 is at the first location relative to frame 110 (e.g., moved by an operator), first roller 120 and second roller 130 are rotatable relative to frame 110. The rotation of first roller 120 and second roller 130 allows workpiece 190 to be inserted between first roller 120 and second roller 130 and/or retracted from apparatus 100. As such, rotation-control member 140 is moved to the first location relative to frame 110 prior to both of these operations and kept at the first location during these operations.

When rotation-control member 140 is at the second location relative to frame 110, first roller 120 and second roller 130 are not rotatable relative to frame 110. Workpiece 190 cannot be inserted between first roller 120 and second roller 130 and/or retracted from apparatus 100. If workpiece 190 has been previously inserted between first roller 120 and second roller 130, workpiece 190 retains the position relative to first roller 120 and second roller 130 and to frame 110. This position is retained even through the pressure is applied to at least the portion of edge surface 192 of workpiece 190. No external support or forces are needed to apparatus 100, which effectively hangs on workpiece 190 due to the frictional coupling between workpiece 190 and each of first roller 120 and second roller 130, either directly or indirectly.

To retract workpiece 190 from apparatus 100 and to stop the application of the pressure onto at least the portion of edge surface 192 of workpiece 190, rotation-control member 140 is first brought back to the first location relative to frame 110. As noted above, first roller 120 and second roller 130 are able to rotate while rotation-control member 140 is at the first location. The rotation of first roller 120 and second roller 130 allows workpiece 190 to advance linearly along second axis 102 and be retracted from apparatus. Workpiece 190 remains frictionally coupled to first roller 120 and second roller 130 while passing the gap between first roller 120 and second roller 130.

The features, described above, allow, in some examples, for one hand operation of apparatus 100. For example, an operator forces rotation-control member 140 to frame 110 to bring rotation-control member 140 to the first location relative to frame 110. In some examples, frame 110 or, more specifically, first roller 120 and second roller 130 is already contacting workpiece 190 and provide reference support. While keeping rotation-control member 140 in the first location, the operator slides apparatus 100 over workpiece 190 or, more specifically, over edge surface 192 or workpiece 190. The operator then releases rotation-control member 140 thereby bringing rotation-control member 140 to the second location relative to frame 110. No further support is needed by the operator. Apparatus 100 remains supported on workpiece 190, while applying pressure on at least a portion of edge surface 192. To remove apparatus 100, the operator again forces rotation-control member 140 to frame 110 to bring rotation-control member 140 to the first location relative to frame 110. At this time, first roller 120 and second roller 130 are frictionally coupled to workpiece 190 and provide reference support. While keeping rotation-control member 140 at the first location, the operator pulls apparatus 100 along second axis 102 and away from edge surface 192 of workpiece 190.

First roller 120 is coupled to and rotatable relative to frame 110. For example, first roller 120 is coupled relative to frame 110 using a bearing, such as a plain bearing (e.g., bushing, journal bearing, sleeve bearing, rifle bearing, composite bearing), a rolling-element bearing (e.g., ball bearing, roller bearing), a jewel bearing, a fluid bearing, a magnetic bearing, and a flexure bearing. First roller 120 is translationally fixed relative to frame 110, such that first roller 120 does not move relative to frame 110 in the direction along first axis 101. This feature controls the gap between first roller 120 and second roller 130 and allows forming frictional coupling between workpiece 190 and each of first roller 120 and second roller 130.

Second roller 130 is coupled and rotatable to frame 110. For example, second roller 130 is coupled relative to frame 110 using a bearing, such as a plain bearing (e.g., bushing, journal bearing, sleeve bearing, rifle bearing, composite bearing), a rolling-element bearing (e.g., ball bearing, roller bearing), a jewel bearing, a fluid bearing, a magnetic bearing, and a flexure bearing. Second roller 130 is also translationally fixed relative to frame 110, such that second roller 130 does not move relative to frame 110 in the direction along first axis 101. Since both first roller 120 and second roller 130 are translationally fixed relative to frame 110, distance D1 between first pivot axis 125 and second pivot axis 135 is constant. This feature is used to apply friction forces on opposing faces 194 or workpiece 190 when workpiece 190 is inserted between first roller 120 and second roller 130.

Rotation-control member 140 is movable relative to frame 110. For example, rotation-control member 140 is slidable relative to frame 110 along second axis 102. In some examples, a linear bearing is positioned between rotation-control member 140 and frame 110 to ensure this moveability. Second biasing member 160 is positioned, in compression, between frame 110 and rotation-control member 140. More specifically, second biasing member 160 urges rotation-control member 140 to the second location relative to frame 110. For example, when an operator applies an external force to rotation-control member 140 relative to frame 110, the operator brings rotation-control member 140 to the first location relative to frame 110 by overcoming the counter-force from second biasing member 160. However, when the operator releases the external force, second biasing member 160 moves rotation-control member 140 back to the second location relative to frame 110 using this counter-force. In some examples, second biasing member 160 is one or more compression springs. When multiple compression springs are used, both springs in each pair of the springs are equally offset from second axis 102.

Referring generally to FIG. 1 and particularly to, e.g., FIGS. 2A-2E, first biasing member 150 comprises engagement portion 161 and plurality of resilient members 153. Each of plurality of resilient members 153 is coupled to engagement portion 161 and to frame 110. Furthermore, each of plurality of resilient members 153 is configured to operate in compression along second axis 102. At least two of plurality of resilient members 153 are spaced away from each other along first axis 101. The preceding subject matter of this paragraph characterizes example 2 of the present disclosure, wherein example 2 also includes the subject matter according to example 1, above.

Engagement portion 161 is used to applying pressure to at least the portion of edge surface 192 when workpiece 190 protrudes between first roller 120 and second roller 130. Plurality of resilient members 153 supports engagement portion 161 when engagement portion 161 applies the pressure. To ensure uniformity of this pressure, plurality of resilient members 153 are positioned at different locations along first axis 101.

In some examples, each of plurality of resilient members 153 is a spring, such as a compression spring (configured to operate with a compression load), a constant-rate spring, a variable-rate spring, a flat spring, a machined spring, a serpentine spring, a garter spring, a cantilever spring, a coil spring or helical spring, and the like.

Referring generally to FIG. 1 and particularly to, e.g., FIGS. 2A-2E, at least two of plurality of resilient members 153 are located on opposite sides of second axis 102 and are spaced away from each other along first axis 101 by separation gap D4. Second axis 102 divides separation gap D4 into two equal halves. The preceding subject matter of this paragraph characterizes example 3 of the present disclosure, wherein example 3 also includes the subject matter according to example 2, above.

The position of plurality of resilient members 153 determines, at least in part, the pressure distribution, applied to at least the portion of edge surface 192. Positioning at least two of plurality of resilient members 153 on opposite sides of second axis 102 ensures uniformity of the pressure. More specifically, these two resilient members are positioned at the same distance away from second axis 102, i.e., these two resilient members are spaced away from each other along first axis 101 by separation gap D4, such that second axis 102 divides separation gap D4 into two equal halves.

In some examples, each of plurality of resilient members 153 is a spring, such as a compression spring (configured to operate with a compression load), a constant spring, a variable spring, a variable stiffness spring, a flat spring, a machined spring, a serpentine spring, a garter spring, a cantilever spring, a coil spring or helical spring, and the like. More specifically, all of plurality of resilient members 153 have the same compression property, such as a spring rate.

Referring generally to FIG. 1 and particularly to, e.g., FIGS. 2A-2E, all of plurality of resilient members 153 are compression springs, which have springs constants, equal to each other. The preceding subject matter of this paragraph characterizes example 4 of the present disclosure, wherein example 4 also includes the subject matter according to example 2 or 3, above.

The springs constants and the position of each compression spring of plurality of resilient members 153 determines the pressure distribution, applied to at least the portion of edge surface 192. When two springs, positioned on opposite sides of second axis 102 and at the same distance away from second axis 102, have the same spring constant, these two springs apply the same force on first biasing member 150, which in turn applies the pressure to at least the portion of edge surface 192.

In some examples, the compression springs are coil springs, which have the same diameter over the entire length of the springs. In some examples, the compression springs are concave or hourglass springs, which taper to a smaller diameter in the center. In some examples, the compression springs are convex or barrels springs, tapered conical springs, spring washers, variable pitch springs, and/or volute springs.

Referring generally to FIG. 1 and particularly to, e.g., FIGS. 2A-2C, engagement portion 161 of first biasing member 150 comprises engagement surface 162 that is parallel to first axis 101 when no pressure is applied to engagement surface 162. The preceding subject matter of this paragraph characterizes example 5 of the present disclosure, wherein example 5 also includes the subject matter according to any one of examples 2 to 4, above.

When engagement surface 162 is parallel to first axis 101, prior to applying the pressure, engagement surface 162 establishes uniform initial contact with at least the portion of edge surface 192 when workpiece 190 protrudes between first roller 120 and second roller 130. In some examples, edge surface 192 is perpendicular to opposing faces 194 of workpiece 190. It should be noted that opposing faces 194 extend parallel to second axis 102 and perpendicular to first axis 101, when workpiece 190 protrudes between first roller 120 and second roller 130.

To maintain engagement surface 162 parallel to first axis 101, first biasing member 150 is supported relative to frame 110, e.g., using plurality of resilient members 153.

Referring generally to FIG. 1 and particularly to, e.g., FIGS. 2A-2D, the angular orientation of engagement surface 162 relative to first axis 101 is capable of being changed by applying at least one force to at least one location on engagement surface 162. The preceding subject matter of this paragraph characterizes example 6 of the present disclosure, wherein example 6 also includes the subject matter according to example 5, above.

Changing the angular orientation of engagement surface 162 allows engagement surface 162 to conform to edge surface 192 of workpiece 190, e.g., when edge surface 192 is not parallel to first axis 101 and/or when edge surface 192 is not perpendicular to opposing faces 194 of workpiece 190.

In some examples, first biasing member 150 is supported by plurality of resilient members 153, which are able to compress independently from each other, thereby allowing first biasing member 150 to tilt relative to frame 110 and to first axis 101 and second axis 102.

Referring generally to FIG. 1 and particularly to, e.g., FIGS. 2A-2D, second axis 102 bisects engagement portion 161 of first biasing member 150 into two equal parts when engagement portion 161 is viewed along the direction, perpendicular to a plane that is parallel to first axis 101 and to second axis 102. The preceding subject matter of this paragraph characterizes example 7 of the present disclosure, wherein example 7 also includes the subject matter according to any one of examples 2 to 6, above.

When second axis 102 bisects engagement portion 161 of first biasing member 150 into two equal parts, second axis 102 extends through the center of engagement portion 161. Workpiece 190, protruding between first roller 120 and second roller 130, is also centered relative to second axis 102. As such, engagement portion 161 and workpiece 190 are also centered, which assists with uniform application of the pressure to edge surface 192 of workpiece 190.

Referring generally to FIG. 1 and particularly to, e.g., FIGS. 2A-2C, frame 110 comprises channel 112, extending along and longitudinally centered on second axis 102. A minimum distance between first roller 120 and second roller 130 is defined by a gap, extending along first axis 101. Second axis 102 bisects the gap between first roller 120 and second roller 130 into two equal parts. The preceding subject matter of this paragraph characterizes example 8 of the present disclosure, wherein example 8 also includes the subject matter according to any one of examples 1 to 7, above.

When workpiece 190 is inserted between first roller 120 and second roller 130, workpiece 190 protrudes into channel 112. In some examples, channel 112 is used for alignment of workpiece 190 within apparatus 100 and, more specifically, relative to first biasing member 150. Channel 112 is aligned relatively to the gap between first roller 120 and second roller 130 along second axis 102, such that both are centered along second axis 102. This axial centering of channel 112 and the gap ensures that workpiece 190 protrudes into channel 112 without interference from frame 110 and ensures the alignment of workpiece 190.

Referring generally to FIG. 1 and particularly to, e.g., FIGS. 2A-2C, channel 112 has channel width D3, which is constant along channel 112. The gap between first roller 120 and second roller 130 has gap width D2, which is smaller than channel width D3. The preceding subject matter of this paragraph characterizes example 9 of the present disclosure, wherein example 9 also includes the subject matter according to example 8, above.

Gap width D2 being smaller than channel width D3 is used for alignment of workpiece 190 in channel 112 or, more specifically, when workpiece 190 protrudes between and past first roller 120 and second roller 130 and into channel 112. Channel 112 effectively aligns and centers workpiece 190 along second axis 102. At the same time, workpiece 190 forms frictional coupling with first roller 120 and second roller 130 and this frictional coupling remains while workpiece 190 protrudes between first roller 120 and second roller 130.

It should be noted that in some examples, at least one of first roller 120 and second roller 130 compress when workpiece 190 protrudes between first roller 120 and second roller 130. In other words, gap width D2 of the gap between first roller 120 and second roller 130 can increase.

Referring generally to FIG. 1 and particularly to, e.g., FIGS. 2A-2C, channel 112 comprises channel surface 114, extending parallel to first axis 101. The preceding subject matter of this paragraph characterizes example 10 of the present disclosure, wherein example 10 also includes the subject matter according to example 9, above.

Channel surface 114 is operable as a positive stop when workpiece 190 protrudes between and past first roller 120 and second roller 130 and into channel 112. Furthermore, In some examples, channel surface 114 conforms to at least a portion of edge surface 192 of workpiece 190 and is used for alignment of workpiece 190 in channel 112.

The position of channel surface 114 relative to first axis 101 also determined the depth of channel 112 and how far workpiece 190 is able to protrude between first roller 120 and second roller 130 and compress first biasing member 150. This, in turn, determined the pressure, applied to at least the portion of edge surface 192.

Referring generally to FIG. 1 and particularly to, e.g., FIGS. 2A-2C, channel 112 further comprises first side channel surface 113 and second side channel surface 115, parallel to each other and to second axis 102. First side channel surface 113 and second side channel surface 115 extend from channel surface 114. The preceding subject matter of this paragraph characterizes example 11 of the present disclosure, wherein example 11 also includes the subject matter according to example 10, above.

First side channel surface 113 and second side channel surface 115 are used for alignment of workpiece 190 within channel 112. Specifically, when workpiece 190 slides within channel 112 along second axis 102, first side channel surface 113 and second side channel surface 115 slide relative to and contact opposing faces 194 of workpiece 190.

In some examples, channel width D3 is slightly greater than workpiece width D5 providing slidable engagement between opposing faces 194 of workpiece 190 and each of first side channel surface 113 and second side channel surface 115. First side channel surface 113 and second side channel surface 115 have a minimal surface roughness to ensure sliding.

Referring generally to FIG. 1 and particularly to, e.g., FIGS. 2A-2C, channel 112 further comprises first leading surface 116, extending from first side channel surface 113 and oblique relative to second axis 102, and second leading surface 117, extending from second side channel surface 115 and oblique relative to second axis 102. The preceding subject matter of this paragraph characterizes example 12 of the present disclosure, wherein example 12 also includes the subject matter according to example 11, above.

First leading surface 116 and second leading surface 117 direct workpiece 190 into a portion of channel 112 between first side channel surface 113 and second side channel surface 115. Before reaching that portion, workpiece 190 is able to tilt relative to second axis 102 of apparatus 100 thereby helping the operator to insert workpiece 190. However, once workpiece 190 is inserted into the portion of channel 112 between first side channel surface 113 and second side channel surface 115, workpiece 190 cannot further tilt and the orientation of workpiece 190 relative to second axis 102 is preserved. It should be noted that workpiece 190 relative is still able to slide within channel 112 relative to frame 110 and along second axis 102.

Referring generally to FIG. 1 and particularly to, e.g., FIGS. 2A-2C, first leading surface 116 and second leading surface 117 of channel 112 define an included angle therebetween. Second axis 102 bisects the included angle into two equal parts. The preceding subject matter of this paragraph characterizes example 13 of the present disclosure, wherein example 13 also includes the subject matter according to example 12, above.

First leading surface 116 and second leading surface 117 direct workpiece 190 into a portion of channel 112 between first side channel surface 113 and second side channel surface 115. Before reaching that portion, workpiece 190 is able to tilt relative to second axis 102 of apparatus 100 thereby helping the operator to insert workpiece 190. When second axis 102 bisects the included angle into two equal parts, first leading surface 116 and second leading surface 117 have the same relative orientation to second axis 102 and workpiece 190 is able to tilt to the same degree in both clockwise and counterclockwise direction relative to second axis 102. In some examples, the included angle is between about 20° and 90° or, more specifically, between about 30° and 75°. A larger value of the included angle allows more tilt.

Referring generally to FIG. 1 and particularly to, e.g., FIGS. 2A-2C, first axis 101 passes through a first virtual plane, a portion of which is coextensive with first leading surface 116 of channel 112, and through a second virtual plane, a portion of which is coextensive with second leading surface 117 of channel 112. The preceding subject matter of this paragraph characterizes example 14 of the present disclosure, wherein example 14 also includes the subject matter according to example 12 or 13, above.

When first axis 101 passes through the first virtual plane and the second virtual plane, first leading surface 116 and second leading surface 117 start below first axis 101 and continue above first axis 101, referring to the orientation of apparatus 100 shown in FIG. 2A. As such, the guidance of workpiece by first leading surface 116 and second leading surface 117 starts before workpiece 190 is inserted between first roller 120 and second roller 130 and continues after workpiece 190 is inserted between first roller 120 and second roller 130.

In some examples, a portion of first leading surface 116 extending above first axis 101, referring to the orientation of apparatus 100 shown in FIG. 2A, is between about 25% and 75% of first leading surface 116, by area. In the same or other examples, a portion of second leading surface 117 extending above first axis 101, referring to the orientation of apparatus 100 shown in FIG. 2A, is between about 25% and 75% of second leading surface 117, by area.

Referring generally to FIG. 1 and particularly to, e.g., FIGS. 2F-2G and 3A-3B, first biasing member 150 comprises engagement portion 161, positioned within channel 112 and movable within channel 112 along second axis 102. The preceding subject matter of this paragraph characterizes example 15 of the present disclosure, wherein example 15 also includes the subject matter according to any one of examples 8 to 14, above.

When engagement portion 161 is positioned within channel 112, channel 112 provides support to engagement portion 161 as engagement portion 161 moves within channel 112 along second axis 102 and applies pressure to edge surface 192 of workpiece 190. Furthermore, channel 112 provides relative orientation of engagement portion 161 and edge surface 192 of workpiece 190.

In some examples, engagement portion 161 is slidably coupled to channel 112 or, more specifically, to first side channel surface 113 and second side channel surface 115 of channel 112. First side channel surface 113 and second side channel surface 115 maintains the orientation of engagement portion 161 along second axis 102.

Referring generally to FIG. 1 and particularly to, e.g., FIGS. 2F-2G, channel 112 comprises channel surface 114, extending parallel to first axis 101. The preceding subject matter of this paragraph characterizes example 16 of the present disclosure, wherein example 16 also includes the subject matter according to example 15, above.

Channel surface 114 is operable as a positive stop, for engagement portion 161, when workpiece 190 protrudes between and past first roller 120 and second roller 130 and into channel 112 and contacts engagement portion 161. The position of channel surface 114 relative to first axis 101 also determines the depth of channel 112 and how far workpiece 190 is able to protrude between first roller 120 and second roller 130 and compressing first biasing member 150. This, in turn, determined the pressure, applied to at least the portion of edge surface 192.

Referring generally to FIG. 1 and particularly to, e.g., FIGS. 2F-2G, first biasing member 150 comprises resilient member 151, positioned within channel 112 and extending between channel surface 114 and engagement portion 161 of first biasing member 150. The preceding subject matter of this paragraph characterizes example 17 of the present disclosure, wherein example 17 also includes the subject matter according to example 16, above.

Resilient member 151 is configured to compress when workpiece 190 protrudes between and past first roller 120 and second roller 130 and into channel 112, contacts engagement portion 161, and pushes engagement portion 161 along second axis 102. The compression level of resilient member 151 determines the pressure, applied to edge surface 192 of workpiece 190. The higher compression of resilient member 151 corresponds to the higher pressure and vice a versa. At the same time, the compression of resilient member 151 is determined by the protrusion of workpiece 190 into channel 112.

In some examples, resilient member 151 is a spring, such as a spring, such as a compression spring (configured to operate with a compression load), a constant spring, a variable spring, a variable stiffness spring, a flat spring, a machined spring, a serpentine spring, a garter spring, a cantilever spring, a coil spring or helical spring, and the like.

Referring generally to FIG. 1 and particularly to, e.g., FIGS. 2F-2G, channel 112 further comprises first side channel surface 113 and second side channel surface 115, parallel to each other and to second axis 102. First side channel surface 113 and second side channel surface 115 extend from channel surface 114. Engagement portion 161 of first biasing member 150 has a clearance fit with first side channel surface 113 and with second side channel surface 115 within channel 112. The preceding subject matter of this paragraph characterizes example 18 of the present disclosure, wherein example 18 also includes the subject matter according to example 16, above.

First side channel surface 113 and second side channel surface 115 are used for alignment of workpiece 190 within channel 112. Specifically, when workpiece 190 slides within channel 112 along second axis 102, first side channel surface 113 and second side channel surface 115 slide relative to and contact opposing faces 194 of workpiece 190. The clearance fit with between engagement portion 161 and each of first side channel surface 113 and second side channel surface 115 ensures that engagement portion 161 is able to travel within channel 112 along second axis 102.

In some examples, channel width D3 is slightly greater than workpiece width D5 providing slidable engagement between opposing faces 194 of workpiece 190 and each of first side channel surface 113 and second side channel surface 115. First side channel surface 113 and second side channel surface 115 have a minimal surface roughness to ensure sliding.

Referring generally to FIG. 1 and particularly to, e.g., FIGS. 2F-2G, channel 112 further comprises first leading surface 116, extending from first side channel surface 113 and oblique relative to second axis 102, and second leading surface 117, extending from second side channel surface 115 and oblique relative to second axis 102. The preceding subject matter of this paragraph characterizes example 19 of the present disclosure, wherein example 19 also includes the subject matter according to example 18, above.

First leading surface 116 and second leading surface 117 direct workpiece 190 into a portion of channel 112 between first side channel surface 113 and second side channel surface 115. Before reaching that portion, workpiece 190 is able to tilt relative to second axis 102 of apparatus 100 thereby helping the operator to insert workpiece 190. However, once workpiece 190 is inserted into the portion of channel 112 between first side channel surface 113 and second side channel surface 115, workpiece 190 cannot further tilt and the orientation of workpiece 190 relative to second axis 102 is preserved. It should be noted that workpiece 190 relative is still able to slide within channel 112 relative to frame 110 and along second axis 102.

Referring generally to FIG. 1 and particularly to, e.g., FIGS. 2F-2G, first leading surface 116 and second leading surface 117 of channel 112 define an included angle therebetween. Second axis 102 bisects the included angle into two equal parts. The preceding subject matter of this paragraph characterizes example 20 of the present disclosure, wherein example 20 also includes the subject matter according to example 19, above.

First leading surface 116 and second leading surface 117 direct workpiece 190 into a portion of channel 112 between first side channel surface 113 and second side channel surface 115. Before reaching that portion, workpiece 190 is able to tilt relative to second axis 102 of apparatus 100 thereby helping the operator to insert workpiece 190. When second axis 102 bisects the included angle into two equal parts, first leading surface 116 and second leading surface 117 have the same relative orientation to second axis 102 and workpiece 190 is able to tilt to the same degree in both clockwise and counterclockwise direction relative to second axis 102. In some examples, the included angle is between about 20° and 90° or, more specifically, between about 30° and 75°. A larger value of the included angle allows more tilt.

Referring generally to FIG. 1 and particularly to, e.g., FIGS. 2F-2G, first axis 101 passes through a first virtual plane, a portion of which is coextensive with first leading surface 116 of channel 112, and through a second virtual plane, a portion of which is coextensive with second leading surface 117 of channel 112. The preceding subject matter of this paragraph characterizes example 21 of the present disclosure, wherein example 21 also includes the subject matter according to example 19 or 20, above.

When first axis 101 passes through the first virtual plane and the second virtual plane, first leading surface 116 and second leading surface 117 start below first axis 101 and continue above first axis 101, referring to the orientation of apparatus 100 shown in FIG. 2F. As such, the guidance of workpiece by first leading surface 116 and second leading surface 117 starts before workpiece 190 is inserted between first roller 120 and second roller 130 and continues after workpiece 190 is inserted between first roller 120 and second roller 130.

In some examples, a portion of first leading surface 116 extending above first axis 101, referring to the orientation of apparatus 100 shown in FIG. 2F, is between about 25% and 75% of first leading surface 116, by area. In the same or other examples, a portion of second leading surface 117 extending above first axis 101, referring to the orientation of apparatus 100 shown in FIG. 2F, is between about 25% and 75% of second leading surface 117, by area.

Referring generally to FIG. 1 and particularly to, e.g., FIGS. 3A-3B, first biasing member 150 is positioned within channel 112 and comprises an elastic material. The preceding subject matter of this paragraph characterizes example 22 of the present disclosure, wherein example 22 also includes the subject matter according to any one of examples 8 to 14, above.

When first biasing member 150 is positioned within channel 112, channel 112 provides support to first biasing member 150 as first biasing member 150 moves within channel 112 along second axis 102 and applies pressure to edge surface 192 of workpiece 190. Furthermore, channel 112 provides relative orientation of first biasing member 150 and edge surface 192 of workpiece 190. First biasing member 150, comprising an elastic material, eliminates the need for additional components, such as a spring. First biasing member 150 compresses, within channel 112, when workpiece 190 protrudes into channel 112. The level of this compression determines the pressure, applied to edge surface 192.

In some examples, first biasing member 150 is slidably coupled to channel 112 or, more specifically, to first side channel surface 113 and second side channel surface 115 of channel 112. First side channel surface 113 and second side channel surface 115 maintains the orientation of first biasing member 150 along second axis 102. In some examples, first biasing member 150 is formed from a compressible material, such as an elastomer (e.g., natural rubber, synthetic rubber, nitrile rubber, silicone rubber, urethane rubber, chloroprene rubber, ethylene vinyl acetate rubber, and the like).

Referring generally to FIG. 1 and particularly to, e.g., FIGS. 2A-2G and 3A-3B, at least one of first roller 120 or second roller 130 comprises an elastic material. The preceding subject matter of this paragraph characterizes example 23 of the present disclosure, wherein example 23 also includes the subject matter according to any one of examples 1 to 22, above.

The elastic material of first roller 120 or second roller 130 allow inserting workpiece 190 between first roller 120 and second roller 130 while applying force on opposing faces 194 of workpiece 190. This force creates friction between opposing faces 194 of workpiece 190 and each of first roller 120 and second roller 130 thereby forming frictional coupling. The frictional coupling prevents workpiece 190 from sliding relative to apparatus 100 when applying the pressure to at least the portion of edge surface 192 of workpiece 190.

When workpiece 190 is inserted between first roller 120 and second roller 130, at least one of first roller 120 or second roller 130 compresses. In these examples, each of first roller 120 and second roller 130 contacts workpiece 190 directly. In some examples, at least a portion of first roller 120 (e.g., forming first outer cylindrical surface 122 of first roller 120) and/or at least a portion of second roller 130 (e.g., forming second outer cylindrical surface 132 of second roller 130) is formed from a compressible material, such as an elastomer (e.g., natural rubber, synthetic rubber, nitrile rubber, silicone rubber, urethane rubber, chloroprene rubber, ethylene vinyl acetate rubber, and the like).

Referring generally to FIG. 1 and particularly to, e.g., FIGS. 2D and 2E, rotation-control member 140 comprises contact surfaces 142, selectively frictionally engageable with first roller 120 and with second roller 130. First axis 101 is located between contact surfaces 142 and first biasing member 150. Second biasing member 160 biases contact surfaces 142 of rotation-control member 140 toward first roller 120 and toward second roller 130. The preceding subject matter of this paragraph characterizes example 24 of the present disclosure, wherein example 24 also includes the subject matter according to any one of examples 1 to 23, above.

Second biasing member 160 biases rotation-control member 140 toward first roller 120 and toward second roller 130 thereby urging rotation-control member 140 from the first location relative to frame 110, shown in FIG. 2D, to the second location, shown in FIG. 2E. For example, when an operator stops applying an external force to (e.g., releases) rotation-control member 140, second biasing member 160 moves rotation-control member 140 to the second location without further actions from the operator. It should be note when rotation-control member 140 is at the first location, first roller 120 and second roller 130 are able to rotate and workpiece 190 can be inserted and retracted from the gap between first roller 120 and second roller 130. However, when rotation-control member 140 is at the second location, first roller 120 and second roller 130 are not able to rotate and workpiece 190 can be inserted and retracted from the gap between first roller 120 and second roller 130. At this second location, contact surfaces 142 of rotation-control member 140 are frictionally coupled to first roller 120 and second roller 130. Therefore, when workpiece 190 is inserted between first roller 120 and second roller 130, the operator simply needs to release rotation-control member 140 for rotation-control member 140 to move to the second location. Workpiece 190 remains inserted between first roller 120 and second roller 130.

In some examples, second biasing member 160 is a spring, such as a compression spring (configured to operate with a compression load), a constant spring, a variable spring, a variable stiffness spring, a flat spring, a machined spring, a serpentine spring, a garter spring, a cantilever spring, a coil spring or helical spring, and the like.

Referring generally to FIG. 1 and particularly to, e.g., FIGS. 2D and 2E and, when rotation-control member 140 is at the first location relative to frame 110, rotation-control member 140 does not contact either one of first roller 120 or second roller 130. When rotation-control member 140 is at the second location relative to frame 110, rotation-control member 140 contacts, directly, first outer cylindrical surface 122 of first roller 120 and second outer cylindrical surface 132 of second roller 130. The preceding subject matter of this paragraph characterizes example 25 of the present disclosure, wherein example 25 also includes the subject matter according to any one of examples 1 to 24, above.

When rotation-control member 140 is at the first location relative to frame 110, first roller 120 and second roller 130 are able to rotate about first pivot axis 125 and second pivot axis 135, respectively. Rotation-control member 140 does not interfere with this rotation, either directly (e.g., direct contact with first roller 120 and second roller 130) or indirectly (through first biasing member 150). More specifically, at the first location, rotation-control member 140 does not contact either one of first roller 120 or second roller 130. Furthermore, at the first location, rotation-control member 140 does not contact first biasing member 150, which, in some examples, wraps around a portion of first roller 120 and a portion of second roller 130.

On other hand, when rotation-control member 140 is at the second location relative to frame 110, rotation-control member 140 contacts, directly or indirectly, first outer cylindrical surface 122 of first roller 120 and second outer cylindrical surface 132 of second roller 130. More specifically, at the second location, rotation-control member 140 prevents first roller 120 and second roller 130 from rotating about first pivot axis 125 and second pivot axis 135, respectively. In some examples, rotation-control member 140 directly contacts first outer cylindrical surface 122 of first roller 120 and second outer cylindrical surface 132 of second roller 130. In other examples, rotation-control member 140 indirectly contacts (e.g., through first biasing member 150) first outer cylindrical surface 122 of first roller 120 and second outer cylindrical surface 132 of second roller 130.

Referring to FIGS. 2A and 2B, in some examples, portions of rotation-control member 140 contacting first biasing member 150 are in the form of wedges to provide higher contact areas between rotation-control member 140 and first biasing member 150. Furthermore, the wedges are positioned in such a way that the clockwise rotation of first roller 120 is restricted more than the counterclockwise rotation and that the counterclockwise rotation of second roller 130 is restricted more than the clockwise rotation. The clockwise rotation of first roller 120 and the counterclockwise rotation of second roller 130 correspond to removal of workpiece 190 from apparatus 100.

Referring generally to FIG. 4 and particularly to, e.g., FIGS. 2A-2G and 3A-3B, method 700 of applying pressure to at least a portion of edge surface 192 is disclosed. Edge surface 192 bridges opposing faces 194 of workpiece 190. Method 700 uses apparatus 100 that comprises frame 110, first roller 120, second roller 130, rotation-control member 140, first biasing member 150, and second biasing member 160. First roller 120 is coupled to frame 110 and is rotatable relative to frame 110 about first pivot axis 125 and translationally fixed relative to frame 110. Second roller 130 is coupled to frame 110 and is rotatable relative to frame 110 about second pivot axis 135 and is translationally fixed relative to frame 110. Second pivot axis 135 is spaced distance D1 from first pivot axis 125 along first axis 101, which intersects and is perpendicular to first pivot axis 125 and to second pivot axis 135. Rotation-control member 140 is coupled to frame 110 and is movable relative to frame 110. First biasing member 150 is coupled to frame 110. Second biasing member 160 is positioned, in compression, between frame 110 and rotation-control member 140. Method 700 comprises (block 710) aligning apparatus 100 with workpiece. 190, such that edge surface 192 of workpiece 190 is centered along second axis 102 that is perpendicular to first axis 101 and that extends between first pivot axis 125 of first roller 120 and second pivot axis 135 of second roller 130. Method 700 further comprises (block 720) positioning rotation-control member 140 at a first location relative to frame 110, such that first roller 120 and second roller 130 are rotatable relative to frame 110. Method 700 also comprises, with rotation-control member 140 positioned at first location relative to frame 110, (block 730) moving apparatus 100 and workpiece 190 relative to each other, such that workpiece 190 is received between first roller 120 and second roller 130, so that first biasing member 150 operates in compression along second axis 102, perpendicular to first axis 101, to first pivot axis 125, and to second pivot axis 135, thus applying the pressure to at least the portion of edge surface 192 of workpiece 190, while first roller 120 and second roller 130 apply equal and opposite forces to opposing faces 194 of workpiece 190. Method 700 additionally comprises (block 740) positioning rotation-control member 140 at a second location relative to frame 110, such that first roller 120 and second roller 130 are fixed relative to frame 110, creating a frictional coupling between apparatus 100 and workpiece 190, which maintains pressure, applied to at least the portion of edge surface 192 by first biasing member 150. The preceding subject matter characterizes example 26 of the present disclosure.

Aligning apparatus 100 with workpiece 190, such that edge surface 192 of workpiece 190 is centered along second axis 102, ensures that workpiece 190 can be later inserted between first roller 120 and second roller 130. Furthermore, positioning rotation-control member 140 at the first location relative to frame 110 ensures that first roller 120 and second roller 130 are able rotatable relative to frame 110 as, for example, is shown in FIG. 2B. The rotation of first roller 120 and second roller 130 allows for workpiece 190 to be inserted between first roller 120 and second roller 130.

Moving apparatus 100 and workpiece 190 relative to each other results in workpiece 190 being received between first roller 120 and second roller 130. Upon containing first biasing member 150 with edge surface 192 of workpiece 190, first biasing member 150 compresses. This contact and compression results in first biasing member 150 applying the pressure to at least the portion of edge surface 192 of workpiece 190. The level of pressure depends on the compression level, which in turn depends on how far workpiece 190 is received between first roller 120 and second roller 130.

When workpiece 190 is received between first roller 120 and second roller 130, first roller 120 and second roller 130 apply equal and opposite forces to opposing faces 194 of workpiece 190. This causes frictional coupling between opposing faces 194 of workpiece 190 and each of first roller 120 and second roller 130, either through a direct contact.

This frictional coupling allows workpiece 190 to move along second axis 102 only when first roller 120 and second roller 130 rotate.

Positioning rotation-control member 140 at the second location relative to frame 110 prevents further rotation of first roller 120 and second roller 130. Workpiece 190 cannot longer move along second axis 102. The frictional coupling between opposing faces 194 of workpiece 190 and each of first roller 120 and second roller 130 now translates into a frictional coupling between apparatus 100 and workpiece 190. At this stage, apparatus 100 or, more specifically, at least a portion of first biasing member 150 maintains pressure, applied to at least the portion of edge surface 192 by first biasing member 150.

Overall, apparatus 100 is configured to apply the pressure to at least the portion of edge surface 192 while apparatus 100 is supported by workpiece 190. Apparatus 100 can be installed on workpiece 190 by an operator with minimal efforts, e.g., using only one hand. Furthermore, apparatus 100 is configured to retain on workpiece 190, supported by opposing faces 194 of workpiece 190. Apparatus 100 applies the pressure uniformly using first biasing member 150, which is configured to operate in compression and conformally contact at least the portion of edge surface 192. The level of pressure is determined by the compression level of first biasing member 150 and, in some examples, is controllable by the degree of protrusion of workpiece 190 into apparatus 100.

The features, described above, allow, in some examples, for one hand operation of apparatus 100. For example, an operator forces rotation-control member 140 to frame 110 to bring rotation-control member 140 to the first location relative to frame 110. In some examples, frame 110 or, more specifically, first roller 120 and second roller 130 are already contacting workpiece 190 and provide reference support. While keeping rotation-control member 140 in the first location, the operator slides apparatus 100 over workpiece 190 or, more specifically, over edge surface 192 or workpiece 190. The operator then releases rotation-control member 140 thereby bringing rotation-control member 140 to the second location relative to frame 110. No further support is needed by the operator. Apparatus 100 remains supported on workpiece 190, while applying pressure on at least a portion of edge surface 192. To remove apparatus 100, the operator again forces rotation-control member 140 to frame 110 to bring rotation-control member 140 to the first location relative to frame 110. At this time, first roller 120 and second roller 130 are frictionally coupled to workpiece 190 and provide reference support. While keeping rotation-control member 140 at the first location, the operator pulls apparatus 100 along second axis 102 and away from edge surface 192 of workpiece 190.

First roller 120 is coupled to and rotatable relative to frame 110. For example, first roller 120 is coupled relative to frame 110 using a bearing, such as a plain bearing (e.g., bushing, journal bearing, sleeve bearing, rifle bearing, composite bearing), a rolling-element bearing (e.g., ball bearing, roller bearing), a jewel bearing, a fluid bearing, a magnetic bearing, and a flexure bearing. First roller 120 is translationally fixed relative to frame 110, such that first roller 120 does not move relative to frame 110 in the direction along first axis 101. This features controls the gap between first roller 120 and second roller 130 and allows forming frictional coupling between workpiece 190 and each of first roller 120 and second roller 130.

Second roller 130 is coupled and rotatable to frame 110. For example, second roller 130 is coupled relative to frame 110 using a bearing, such as a plain bearing (e.g., bushing, journal bearing, sleeve bearing, rifle bearing, composite bearing), a rolling-element bearing (e.g., ball bearing, roller bearing), a jewel bearing, a fluid bearing, a magnetic bearing, and a flexure bearing. Second roller 130 is also translationally fixed relative to frame 110, such that second roller 130 does not move relative to frame 110 in the direction along first axis 101. Since both first roller 120 and second roller 130 are translationally fixed relative to frame 110, distance D1 between first pivot axis 125 and second pivot axis 135 is constant. This feature is used to apply friction forces on opposing faces 194 or workpiece 190 when workpiece 190 is inserted between first roller 120 and second roller 130.

Rotation-control member 140 is movable relative to frame 110. For example, rotation-control member 140 is slidable relative to frame 110 along second axis 102. In some examples, a linear bearing is positioned between rotation-control member 140 and frame 110 to ensure this moveability. Second biasing member 160 is positioned, in compression, between frame 110 and rotation-control member 140. More specifically, second biasing member 160 urges rotation-control member 140 to the second location relative to frame 110. For example, when an operator applies an external force to rotation-control member 140 relative to frame 110, the operator brings rotation-control member 140 to the first location relative to frame 110 by overcoming the counter-force from second biasing member 160. However, when the operator releases the external force, second biasing member 160 moves rotation-control member 140 back to the second location relative to frame 110 using this counter-force. In some examples, second biasing member 160 is one or more compression springs. When multiple compression springs are used, both springs in each pair of the springs are equally offset from second axis 102.

Referring generally to FIG. 4 and particularly to, e.g., FIGS. 2C-2E, method 700 further comprises (block 735) moving apparatus 100 and workpiece 190 relative to each other, with rotation-control member 140 positioned at the first location relative to frame 110, such that workpiece 190 is extracted from a gap between first roller 120 and second roller 130. The preceding subject matter of this paragraph characterizes example 27 of the present disclosure, wherein example 27 also includes the subject matter according to example 26, above.

While apparatus 100 the pressure to at least the portion of edge surface 192 of workpiece 190, rotation-control member 140 positioned at the second location relative to frame 110 to ensure that the relative position of workpiece 190 and apparatus 100 is maintained. Once further application of the pressure is no longer needed, workpiece 190 removed from apparatus 100. The removal of workpiece 190 requires rotation of first roller 120 and second roller 130, which in turn requires for rotation-control member 140 to be positioned at the first location relative to frame 110. Once rotation-control member 140 is at the first location, apparatus 100 and workpiece 190 can be moved relative to each other, such that workpiece 190 is extracted from the gap between first roller 120 and second roller 130.

In some examples, an operator applies force into rotation-control member 140 relative to frame 110 to move rotation-control member 140 from the second location to the first location. Moving apparatus 100 and workpiece 190 relative to each other involves pulling apparatus 100 relative to workpiece 190 at least in the direction along second axis 102.

Referring generally to FIG. 4 and particularly to, e.g., FIGS. 2A and 2B, according to method 700, (block 720) positioning rotation-control member 140 at the first location relative to frame 110 comprises (block 722) compressing second biasing member 160. The preceding subject matter of this paragraph characterizes example 28 of the present disclosure, wherein example 28 also includes the subject matter according to example 26 or 27, above.

In some examples, second biasing member 160 is used to move rotation-control member 140 from the first location to the second location relative to frame 110 when no external forces are applied between rotation-control member 140 and frame 110. In these examples, to bring rotation-control member 140 back to the first location relative to frame 110 second biasing member 160 is compressed.

In some examples, second biasing member 160 is a spring, such as a compression spring (configured to operate with a compression load), a constant spring, a variable spring, a variable stiffness spring, a flat spring, a machined spring, a serpentine spring, a garter spring, a cantilever spring, a coil spring or helical spring, and the like.

Referring generally to FIG. 4 and particularly to, e.g., FIGS. 2A and 2B, according to method 700, (block 722) compressing second biasing member 160 comprises applying an external force to rotation-control member 140 along second axis 102 toward workpiece 190. The preceding subject matter of this paragraph characterizes example 29 of the present disclosure, wherein example 29 also includes the subject matter according to example 28, above.

In some examples, second biasing member 160 is used to move rotation-control member 140 from the first location to the second location relative to frame 110 when no external forces are applied between rotation-control member 140 and frame 110. In these examples, to bring rotation-control member 140 back to the first location relative to frame 110 second biasing member 160 is compressed or, more specifically, an external force is applied to rotation-control member 140 along second axis 102 toward workpiece 190. It should be noted that during this operation, frame 110 directly or indirectly engages workpiece 190.

In some examples, second biasing member 160 is a spring, such as a compression spring (configured to operate with a compression load), a constant spring, a variable spring, a variable stiffness spring, a flat spring, a machined spring, a serpentine spring, a garter spring, a cantilever spring, a coil spring or helical spring, and the like.

Referring generally to FIG. 4 and particularly to, e.g., FIGS. 2A, 2B, and 2E, according to method 700, (block 740) positioning rotation-control member 140 at the second location relative to frame 110 comprises eliminating the external force, applied to rotation-control member 140 along second axis 102 toward workpiece 190, so that second biasing member 160 extends and moves frame 110 and rotation-control member 140 relative to each other in opposite directions until first roller 120 and second roller 130 become frictionally coupled with rotation-control member 140. The preceding subject matter of this paragraph characterizes example 30 of the present disclosure, wherein example 30 also includes the subject matter according to example 29, above.

In some examples, second biasing member 160 is used to move rotation-control member 140 from the first location to the second location relative to frame 110 when no external forces are applied between rotation-control member 140 and frame 110. In these examples, eliminating the external force, applied to rotation-control member 140 along second axis 102 toward workpiece 190, results in second biasing member 160 extending and moving frame 110 and rotation-control member 140 relative to each other in opposite directions. Rotation-control member 140 is moved until first roller 120 and second roller 130 become frictionally coupled with rotation-control member 140. At this point, rotation-control member 140 is at the second location and first roller 120 and second roller 130 are no longer able to rotate.

In some examples, second biasing member 160 is a spring, positioned between rotation-control member 140 and frame 110. More specifically, second biasing member 160 is a spring, such as a compression spring (configured to operate with a compression load), a constant spring, a variable spring, a variable stiffness spring, a flat spring, a machined spring, a serpentine spring, a garter spring, a cantilever spring, a coil spring or helical spring, and the like.

Referring generally to FIG. 4 and particularly to, e.g., FIGS. 2A and 2B, according to method 700, (block 720) positioning rotation-control member 140 at the first location relative to frame 110 comprises (block 724) terminating the direct contact between rotation-control member 140 and each of first roller 120 and second roller 130. The preceding subject matter of this paragraph characterizes example 31 of the present disclosure, wherein example 31 also includes the subject matter according to any one of examples 26 to 30, above.

When rotation-control member 140 is at the second location, rotation-control member 140 directly contacts first roller 120 and second roller 130 or directly contacts first biasing member 150. In either case, rotation-control member 140 is frictionally coupled to first roller 120 and second roller 130 thereby preventing first roller 120 and second roller 130 from rotating. Positioning rotation-control member 140 at the first location relative to frame 110 severs this frictional coupling. More specifically, positioning rotation-control member 140 at the first location terminates the direct contact between rotation-control member 140 and each of first roller 120 and second roller 130 or terminates the direct contact between rotation-control member 140 and first biasing member 150.

In some examples, terminating the direct contact between rotation-control member 140 and each of first roller 120 and second roller 130 or terminating the direct contact between rotation-control member 140 and first biasing member 150 involves applying a force to rotation-control member 140 relative to frame 110.

Referring generally to FIG. 4 and particularly to, e.g., FIGS. 2C-2G, according to method 700, (block 730) moving apparatus 100 and workpiece 190 relative to each other, such that workpiece 190 is received between first roller 120 and second roller 130, further comprises compressing and elastically deforming at least one of first roller 120 or second roller 130 against workpiece 190. The preceding subject matter of this paragraph characterizes example 32 of the present disclosure, wherein example 32 also includes the subject matter according to any one of examples 26 to 31, above.

In some examples, gap width D2 of the gap between first roller 120 and second roller 130 is less than width D5 of workpiece 190. As such, when workpiece 190 is inserted between first roller 120 and second roller at least one of first roller 120 or second roller 130 compresses. This compression creates the friction between opposing faces 194 of workpiece 190 and each of first roller 120 and second roller 130 thereby establishing frictional coupling between workpiece 190 and each of first roller 120 and second roller 130.

In the same or other examples, at least a portion of first roller 120 (e.g., forming first outer cylindrical surface 122 of first roller 120) and/or at least a portion of second roller 130 (e.g., forming second outer cylindrical surface 132 of second roller 130) is formed from a compressible material, such as an elastomer (e.g., natural rubber, synthetic rubber, nitrile rubber, silicone rubber, urethane rubber, chloroprene rubber, ethylene vinyl acetate rubber, and the like).

Referring generally to FIG. 4 and particularly to, e.g., FIGS. 2A-2D, according to method 700, positioning rotation-control member 140 at second location relative to frame 110 fixes frame 110 relative to workpiece 190. The preceding subject matter of this paragraph characterizes example 33 of the present disclosure, wherein example 33 also includes the subject matter according to any one of examples 26 to 32, above.

When rotation-control member 140 is at the second location, first roller 120 and second roller 130 are not able to rotate relative to rotation-control member 140. Furthermore, when workpiece. 190 is inserted between first roller 120 and second roller 130, workpiece 190 is frictionally coupled to each of first roller 120 and second roller 130 and can only change position within apparatus 100 when first roller 120 and second roller 130 rotate. Therefore, without first roller 120 and second roller 130 being able to rotate, workpiece 190 remains stationary within apparatus 100 and in particular, relative to frame 110.

Referring generally to FIG. 4 and particularly to, e.g., FIGS. 2D, 2E, and 2G, first biasing member 150 comprises engagement portion 161 and plurality of resilient members 153, each coupled to engagement portion 161 and to frame 110. According to method 700, (block 730) moving apparatus 100 and workpiece 190 relative to each other, such that workpiece 190 is received between first roller 120 and second roller 130, is performed so that each of plurality of resilient members 153 operates in compression along second axis 102, biasing engagement portion 161 against at least the portion of edge surface 192 of workpiece 190. The preceding subject matter of this paragraph characterizes example 34 of the present disclosure, wherein example 34 also includes the subject matter according to any one of examples 26 to 33, above.

Engagement portion 161 is used to applying pressure to at least the portion of edge surface 192 when workpiece 190 protrudes between first roller 120 and second roller 130. Plurality of resilient members 153 supports engagement portion 161 when engagement portion 161 applies the pressure. To ensure uniformity of this pressure, plurality of resilient members 153 are positioned at different locations along first axis 101.

In some examples, each of plurality of resilient members 153 is a spring, such as a compression spring (configured to operate with a compression load), a constant spring, a variable spring, a variable stiffness spring, a flat spring, a machined spring, a serpentine spring, a garter spring, a cantilever spring, a coil spring or helical spring, and the like.

Referring generally to FIG. 4 and particularly to, e.g., FIGS. 2D, 2E, and 2G, according to method 700, plurality of resilient members 153 are compression springs, which have springs constants, equal to each other. The preceding subject matter of this paragraph characterizes example 35 of the present disclosure, wherein example 35 also includes the subject matter according to example 34, above.

The springs constants and the position of each compression spring of plurality of resilient members 153 determines the pressure distribution, applied to at least the portion of edge surface 192. When two springs, positioned on opposite sides of second axis 102 and at the same distance away from second axis 102, have the same spring constant, these two springs apply the same force on first biasing member 150, which in turn applies the pressure to at least the portion of edge surface 192.

In some examples, the compression springs are coil springs, which have the same diameter over the entire length of the springs. In some examples, the compression springs are concave or hourglass springs, which taper to a smaller diameter in the center. In some examples, the compression springs are convex or barrels springs, tapered conical springs, spring washers, variable pitch springs, and/or volute springs.

Referring generally to FIG. 4 and particularly to, e.g., FIGS. 2A-2E, according to method 700, at least two of plurality of resilient members 153 are located on opposite sides of second axis 102 and are spaced away from each other along first axis 101 by separation gap D4. Second axis 102 divides separation gap D4 into two equal halves. The preceding subject matter of this paragraph characterizes example 36 of the present disclosure, wherein example 36 also includes the subject matter according to example 34 or 35, above.

The position of plurality of resilient members 153 determines, at least in part, the pressure distribution applied to at least the portion of edge surface 192. Positioning at least two of plurality of resilient members 153 on opposite sides of second axis 102 ensures uniformity of the pressure. More specifically, these two resilient members are positioned at the same distance away from second axis 102, i.e., these two resilient members are spaced away from each other along first axis 101 by separation gap D4, such that second axis 102 divides separation gap D4 into two equal halves.

In some examples, each of plurality of resilient members 153 is a spring, such as a compression spring (configured to operate with a compression load), a constant spring, a variable spring, a variable stiffness spring, a flat spring, a machined spring, a serpentine spring, a garter spring, a cantilever spring, a coil spring or helical spring, and the like. More specifically, all of plurality of resilient members 153 have the same compression property, such as a spring rate.

Referring generally to FIG. 4 and particularly to, e.g., FIGS. 2A-2C, engagement portion 161 comprises engagement surface 162. According to method 700, prior to (block 730) moving apparatus 100 and workpiece 190 relative to each other, such that workpiece 190 is received between first roller 120 and second roller 130, engagement surface 162 is parallel to first axis 101. The preceding subject matter of this paragraph characterizes example 37 of the present disclosure, wherein example 37 also includes the subject matter according to any one of examples 34 to 36, above.

When engagement surface 162 is parallel to first axis 101, prior to applying the pressure, engagement surface 162 establishes uniform initial contact with at least the portion of edge surface 192 when workpiece 190 protrudes between first roller 120 and second roller 130. In some examples, edge surface 192 is perpendicular to opposing faces 194 of workpiece 190. It should be noted that opposing faces 194 extend parallel to second axis 102 and perpendicular to first axis 101, when workpiece 190 protrudes between first roller 120 and second roller 130.

To maintain engagement surface 162 parallel to first axis 101, first biasing member 150 is supported relative to frame 110, e.g., using plurality of resilient members 153.

Referring generally to FIG. 4 and particularly to, e.g., FIGS. 2D-2E and 2G, according to method 700, after (block 730) moving apparatus 100 and workpiece 190 relative to each other, such that workpiece 190 is received between first roller 120 and second roller 130, engagement surface 162 conforms to at least the portion of edge surface 192 of workpiece 190. The preceding subject matter of this paragraph characterizes example 38 of the present disclosure, wherein example 38 also includes the subject matter according to example 37, above.

When engagement surface 162 conforms to at least the portion of edge surface 192 of workpiece 190, the pressure is uniformly applied to the entire portion. In other words, the entire portion is in contact with engagement surface 162 because of this conformal contact.

In some examples, engagement surface 162 is formed from a compressible material, such as an elastomer (e.g., natural rubber, synthetic rubber, nitrile rubber, silicone rubber, urethane rubber, chloroprene rubber, ethylene vinyl acetate rubber, and the like).

Referring generally to FIG. 4 and particularly to, e.g., FIGS. 2A-2D, frame 110 comprises channel 112, extending along and longitudinally centered on second axis 102, which is perpendicular to first axis 101. According to method 700, (block 730) moving apparatus 100 and workpiece 190 relative to each other, such that workpiece 190 is received between first roller 120 and second roller 130, comprises advancing edge surface 192 of workpiece 190 into channel 112. The preceding subject matter of this paragraph characterizes example 39 of the present disclosure, wherein example 39 also includes the subject matter according to any one of examples 26 to 38, above.

When workpiece 190 is received between first roller 120 and second roller 130 and moved relative to apparatus 100, workpiece 190 protrudes into channel 112. In some examples, channel 112 is used for alignment of workpiece 190 within apparatus 100 and, more specifically, relative to first biasing member 150.

In some examples, channel 112 is aligned relatively to the gap between first roller 120 and second roller 130 along second axis 102, such that both are centered along second axis 102. This axial centering of channel 112 and the gap ensures that workpiece 190 protrudes into channel 112 without interference from frame 110 and ensures the alignment of workpiece 190.

Referring generally to FIG. 4 and particularly to, e.g., FIGS. 2F-2G and 3A-3B, first biasing member 150 comprises engagement portion 161, positioned within channel 112. According to method 700, (block 730) moving apparatus 100 and workpiece 190 relative to each other, such that workpiece 190 is received between first roller 120 and second roller 130, comprises moving engagement portion 161 within channel 112 along second axis 102. The preceding subject matter of this paragraph characterizes example 40 of the present disclosure, wherein example 40 also includes the subject matter according to example 39, above.

When engagement portion 161 is positioned within channel 112, channel 112 provides support to engagement portion 161 as engagement portion 161 moves within channel 112 along second axis 102 and applies pressure to edge surface 192 of workpiece 190. Furthermore, channel 112 provides relative orientation of engagement portion 161 and edge surface 192 of workpiece 190.

In some examples, engagement portion 161 is slidably coupled to channel 112 or, more specifically, to first side channel surface 113 and second side channel surface 115 of channel 112. First side channel surface 113 and second side channel surface 115 maintains the orientation of engagement portion 161 along second axis 102.

Referring generally to FIG. 4 and particularly to, e.g., FIGS. 2F and 2G, channel 112 comprises channel surface 114, extending parallel to first axis 101. According to method 700, (block 730) moving apparatus 100 and workpiece 190 relative to each other, such that workpiece 190 is received between first roller 120 and second roller 130, is performed until engagement portion 161 of first biasing member 150 contacts channel surface 114. The preceding subject matter of this paragraph characterizes example 41 of the present disclosure, wherein example 41 also includes the subject matter according to example 40, above.

Channel surface 114 is operable as a positive stop when workpiece 190 protrudes between and past first roller 120 and second roller 130 and into channel 112. The position of channel surface 114 relative to first axis 101 also determines the depth of channel 112 and how far workpiece 190 is able to protrude between first roller 120 and second roller 130 and compress first biasing member 150. This, in turn, determined the pressure, applied to at least the portion of edge surface 192.

Referring generally to FIG. 4 and particularly to, e.g., FIGS. 2F and 2G, channel 112 comprises channel surface 114, extending parallel to first axis 101. Channel 112 further comprises first side channel surface 113 and second side channel surface 115, parallel to each other and to second axis 102. According to method 700, (block 730) moving apparatus 100 and workpiece 190 relative to each other, such that workpiece 190 is received between first roller 120 and second roller 130, comprises (block 732) guiding opposing faces 194 of workpiece 190 between first side channel surface 113 and second side channel surface 115. The preceding subject matter of this paragraph characterizes example 42 of the present disclosure, wherein example 42 also includes the subject matter according to any one of examples 39 to 41, above.

First side channel surface 113 and second side channel surface 115 are used for alignment of workpiece 190 within channel 112. Specifically, when workpiece 190 slides within channel 112 along second axis 102, first side channel surface 113 and second side channel surface 115 slide relative to and contact opposing faces 194 of workpiece 190 while preserving the orientation of workpiece 190 relative to second axis 102.

In some examples, channel width D3 is slightly greater than workpiece width D5 providing slidable engagement between opposing faces 194 of workpiece 190 and each of first side channel surface 113 and second side channel surface 115. First side channel surface 113 and second side channel surface 115 have a minimal surface roughness to ensure sliding.

Referring generally to FIG. 4 and particularly to, e.g., FIGS. 2F and 2G, channel 112 further comprises first leading surface 116, extending from first side channel surface 113 and oblique relative to second axis 102, and second leading surface 117, extending from second side channel surface 115 and oblique relative to second axis 102. According to method 700, (block 710) aligning apparatus 100 with workpiece 190, such that edge surface 192 of workpiece 190 is centered along second axis 102, comprises guiding opposing faces 194 of workpiece 190 between first leading surface 116 and second leading surface 117. The preceding subject matter of this paragraph characterizes example 43 of the present disclosure, wherein example 43 also includes the subject matter according to example 42, above.

First leading surface 116 and second leading surface 117 direct workpiece 190 into a portion of channel 112 between first side channel surface 113 and second side channel surface 115. Before reaching that portion, workpiece 190 is able to tilt relative to second axis 102 of apparatus 100 thereby helping the operator to insert workpiece 190. However, once workpiece 190 is inserted into the portion of channel 112 between first side channel surface 113 and second side channel surface 115, workpiece 190 cannot further tilt and the orientation of workpiece 190 relative to second axis 102 is preserved. It should be noted that workpiece 190 relative is still able to slide within channel 112 relative to frame 110 and along second axis 102.

Referring generally to FIG. 4 and particularly to, e.g., FIGS. 2F and 2G, according to method 700, (block 732) guiding opposing faces 194 of workpiece 190 between first side channel surface 113 and second side channel surface 115 comprises receiving opposing faces 194 of workpiece 190 between first side channel surface 113 and second side channel surface 115 with a clearance fit. The preceding subject matter of this paragraph characterizes example 44 of the present disclosure, wherein example 44 also includes the subject matter according to example 42 or 43, above.

The clearance fit between opposing faces 194 of workpiece 190 between first side channel surface 113 and second side channel surface 115 ensures that workpiece 190 is able to slide relative to frame 110 along second axis 102. Furthermore, the clearance fit ensures that the orientation of workpiece 190 and second axis 102 of apparatus 100 is maintained.

In some examples, channel width D3 is slightly greater than workpiece width D5 providing slidable engagement between opposing faces 194 of workpiece 190 and each of first side channel surface 113 and second side channel surface 115. First side channel surface 113 and second side channel surface 115 have a minimal surface roughness to ensure sliding.

Referring generally to FIG. 4 and particularly to, e.g., FIGS. 2F and 2G, according to method 700, a minimum distance between first roller 120 and second roller 130 is defined by a gap, extending along first axis 101. Second axis 102 bisects the gap between first roller 120 and second roller 130 into two equal parts. Channel 112 has channel width D3, which is constant along channel 112. The gap between first roller 120 and second roller 130 has gap width D2, which is smaller than channel width D3. The preceding subject matter of this paragraph characterizes example 45 of the present disclosure, wherein example 45 also includes the subject matter according to any one of examples 39 to 44, above.

When workpiece 190 is inserted between first roller 120 and second roller 130, workpiece 190 protrudes into channel 112. In some examples, channel 112 is used for alignment of workpiece 190 within apparatus 100 and, more specifically, relative to first biasing member 150. Channel 112 is aligned relatively to the gap between first roller 120 and second roller 130 along second axis 102, such that both are centered along second axis 102. This axial centering of channel 112 and the gap ensures that workpiece 190 protrudes into channel 112 without interference from frame 110 and ensures the alignment of workpiece 190.

Gap width D2 being smaller than channel width D3 is used for alignment of workpiece 190 in channel 112 or, more specifically, when workpiece 190 protrudes between and past first roller 120 and second roller 130 and into channel 112. Channel 112 effectively aligns and centers workpiece 190 along second axis 102. At the same time, workpiece 190 forms frictional coupling with first roller 120 and second roller 130 and this frictional coupling remains while workpiece 190 protrudes between first roller 120 and second roller 130.

It should be noted that in some examples, at least one of first roller 120 and second roller 130 compress when workpiece 190 protrudes between first roller 120 and second roller 130. In other words, gap width D2 of the gap between first roller 120 and second roller 130 can increase.

Examples of the present disclosure may be described in the context of aircraft manufacturing and service method 1100, as shown in FIG. 5 and aircraft 1102 as shown in FIG. 6. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and methods) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An apparatus for applying pressure to at least a portion of an edge surface, which bridges opposing faces of a workpiece, the apparatus comprising:
 a frame;
 a first roller, coupled to the frame, rotatable relative to the frame about a first pivot axis, and translationally fixed relative to the frame;
 a second roller, coupled to the frame, rotatable relative to the frame about a second pivot axis, and translationally fixed relative to the frame, and wherein the second pivot axis is spaced a distance (D1) from the first pivot axis along a first axis, which intersects and is perpendicular to the first pivot axis and to the second pivot axis;
 a rotation-control member, coupled to the frame and movable relative to the frame;
 a first biasing member, configured to operate in compression along a second axis that is perpendicular to the first axis, to the first pivot axis, and to the second pivot axis; and
 a second biasing member, positioned, in compression, between the frame and the rotation-control member;
 and wherein:
  when the rotation-control member is at a first location relative to the frame, the first roller and the second roller are rotatable relative to the frame; and
  when the rotation-control member is at a second location relative to the frame, the first roller and the second roller are rotationally fixed relative to the frame.

2. The apparatus according to claim 1, wherein:
 the first biasing member comprises an engagement portion and a plurality of resilient members, each coupled to the engagement portion and to the frame and each configured to operate in compression along the second axis; and
 at least two of the plurality of resilient members are spaced away from each other along the first axis.

3. The apparatus according to claim 2, wherein:
 at least the two of the plurality of resilient members are located on opposite sides of the second axis and are spaced away from each other along the first axis by a separation gap (D4); and
 the second axis divides the separation gap (D4) into two equal halves.

4. The apparatus according to claim 1, wherein:
 the frame comprises a channel, extending along and longitudinally centered on the second axis;

a minimum distance between the first roller and the second roller is defined by a gap, extending widthwise along the first axis; and the second axis bisects the gap between the first roller and the second roller into two equal parts.

5. The apparatus according claim 4, wherein the first biasing member comprises an engagement portion, positioned within the channel, and movable within the channel along the second axis.

6. The apparatus according to claim 5, wherein the channel comprises a channel surface, extending parallel to the first axis and perpendicular to the second axis.

7. The apparatus according to claim 4, wherein:
the channel has a channel width (D3), which is constant along the channel; and
the gap between the first roller and the second roller has a gap width (D2), which is smaller than the channel width (D3).

8. The apparatus according to claim 7, wherein the channel comprises a channel surface, extending parallel to the first axis.

9. The apparatus according to claim 8, wherein:
the channel further comprises a first side channel surface and a second side channel surface, parallel to each other and to the second axis; and
the first side channel surface and the second side channel surface extend from the channel surface.

10. The apparatus according to claim 9, wherein the channel further comprises:
a first leading surface, extending from the first side channel surface and oblique relative to the second axis; and
a second leading surface, extending from the second side channel surface and oblique relative to the second axis.

11. A method of applying pressure to at least a portion of an edge surface, which bridges opposing faces of a workpie, using an apparatus that comprises a frame; a first roller, coupled to the frame and rotatable relative to the frame about a first pivot axis and translationally fixed relative to the frame; a second roller, coupled to the frame and rotatable relative to the frame about a second pivot axis and translationally fixed relative to the frame , and wherein the second pivot axis is spaced a distance (D1) from the first pivot axis along a first axis, which intersects and is perpendicular to the first pivot axis and to the second pivot axi, a rotation-control member, coupled to the frame and movable relative to the frame; a first biasing member, coupled to the frame; and a second biasing member, positioned, in compression, between the frame and the rotation-control member, the method comprising steps of:
aligning the apparatus with the workpiece, such that the edge surface of the workpiece is centered along a second axis that is perpendicular to the first axis and that extends between the first pivot axis of the first roller and the second pivot axis of the second roller;
positioning the rotation-control member at a first location relative to the frame, such that the first roller and the second roller are rotatable relative to the frame;
with the rotation-control member positioned at the first location relative to the frame, moving the apparatus and the workpiece relative to each other, such that the workpiece is received between the first roller and the second roller so that the first biasing member operates in compression along the second axis, perpendicular to the first axis, to the first pivot axis, and to the second pivot axis, thus applying the pressure to at least the portion of the edge surface of the workpiece, while the first roller and the second roller apply equal and opposite forces to the opposing faces of the workpiece; and positioning the rotation-control member at a second location relative to the frame, such that the first roller and the second roller are fixed relative to the frame, creating a frictional coupling between the apparatus and the workpiece, which maintains the pressure, applied to at least the portion of the edge surface by the first biasing member.

12. The method according to claim 11, further comprising a step of moving the apparatus and the workpiece relative to each other, with the rotation-control member positioned at the first location relative to the frame, such that the workpiece is extracted from a gap between the first roller and the second roller.

13. The method according to claim 11, wherein the step of positioning the rotation-control member at the first location relative to the frame comprises terminating direct contact between the rotation-control member and each of the first roller and the second roller.

14. The method according to claim 11, wherein the step of moving the apparatus and the workpiece relative to each other such that the workpiece is received between the first roller and the second roller further comprises compressing and elastically deforming at least one of the first roller or the second roller against the workpiece.

15. The method according to claim 11, wherein the step of positioning the rotation-control member at the second location relative to the frame fixes the frame relative to the workpiece.

16. The method according to claim 11, wherein:
the first biasing member comprises an engagement portion and a plurality of resilient members, each coupled to the engagement portion and to the frame; and
the step of moving the apparatus and the workpiece relative to each other such that the workpiece is received between the first roller and the second roller is performed so that each of the plurality of resilient members operates in compression along the second axis, biasing the engagement portion against at least the portion of the edge surface of the workpiece.

17. The method according to claim 11, wherein:
the frame comprises a channel, extending along and longitudinally centered on the second axis, which is perpendicular to the first axis; and
the step of moving the apparatus and the workpiece relative to each other such that the workpiece is received between the first roller and the second roller comprises advancing the edge surface of the workpiece into the channel.

18. The method according to claim 11, wherein the step of positioning the rotation-control member at the first location relative to the frame comprises a step of compressing the second biasing member.

19. The method according to claim 18, wherein the step of compressing the second biasing member comprises applying an external force to the rotation-control member along the second axis toward the workpiece.

20. The method according to claim 19, wherein the step of positioning the rotation-control member at the second location relative to the frame comprises eliminating the external force, applied to the rotation-control member along the second axis toward the workpiece, so that the second biasing member extends and moves the frame and the rotation-control member relative to each other in opposite directions until the first roller and the second roller become frictionally coupled with the rotation-control member.

* * * * *